United States Patent
Thiele

(10) Patent No.: US 8,200,346 B2
(45) Date of Patent: Jun. 12, 2012

(54) MODEL PREDICTIVE CONTROLLER WITH TUNABLE INTEGRAL COMPONENT TO COMPENSATE FOR MODEL MISMATCH

(75) Inventor: Dirk Thiele, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 314 days.

(21) Appl. No.: 12/698,991

(22) Filed: Feb. 2, 2010

(65) Prior Publication Data

US 2010/0204808 A1 Aug. 12, 2010

Related U.S. Application Data

(60) Provisional application No. 61/149,147, filed on Feb. 2, 2009.

(51) Int. Cl.
*G05B 13/02* (2006.01)

(52) U.S. Cl. .......................... 700/44; 700/45

(58) Field of Classification Search .............. 700/30, 700/44, 45

See application file for complete search history.

(56) References Cited

U.S. PATENT DOCUMENTS

| | | | |
|---|---|---|---|
| 4,549,123 A | 10/1985 | Hagglund et al. | |
| 5,453,925 A | 9/1995 | Wojsznis et al. | |
| 5,519,605 A * | 5/1996 | Cawlfield | 700/31 |
| 6,056,781 A * | 5/2000 | Wassick et al. | 703/12 |
| 6,847,954 B1 | 1/2005 | Wojsznis et al. | |
| 7,050,863 B2 * | 5/2006 | Mehta et al. | 700/29 |
| 7,949,415 B2 * | 5/2011 | Chia et al. | 700/29 |
| 2007/0276512 A1 | 11/2007 | Fan et al. | |
| 2010/0268353 A1 * | 10/2010 | Crisalle et al. | 700/29 |

OTHER PUBLICATIONS

"ADCO—Adaptive Riccati Controller," (1992), Availalbe at URL:http://www.ipas-systeme.de/products111.htm.

Alfonseca et al., "Web-Based Simulation of Systems Described by Partial Differential Equations," Proceedings of the 2001 Winter Simulation Conference, pp. 629-636 (2001).

Astrom et al., PID Controllers Theory, Design and Tuning, 2nd ed., ISA (1995).

Badgwell et al., "Distrubance Model Design for Linear Models," Proceedings of ACC, pp. 1621-1626 (2002).

Badwe et al., "Quantifying the Impact of Model-Plant Mismatch on Controller Performance: A Non-Invasive Approach," International Symposium on Advanced Control of Industrial Processes (2008).

Bialkowski, "On Lambda Tuning—The How and Why," pp. 1-15 (Apr. 2002).

(Continued)

*Primary Examiner* — Ryan Jarrett

(74) *Attorney, Agent, or Firm* — Marshall, Gerstein & Borun LLP

(57) ABSTRACT

An MPC controller technique integrates feedback control performance better than methods commonly used today in MPC type controllers, resulting in an MPC controller that performs better than traditional MPC techniques in the presence of process model mismatch. In particular, MPC controller performance is enhanced by adding a tunable integration block to the MPC controller that develops an integral component indicative of the prediction or other control error, and adds this component to the output of an MPC controller algorithm to provide for faster or better control in the presence of model mismatch, which is the ultimate reason for the prediction error in the first place. This technique enables the MPC controller to react more quickly and to provide better set point change and load disturbance performance in the presence of model mismatch, without decreasing the robustness of the MPC controller.

40 Claims, 15 Drawing Sheets

OTHER PUBLICATIONS

Blessing, "Parameter Estimation of State-Space Models for Multivariable Systems with Correlation Analysis and Method of Least Squares," 4th IFAC-O, pp. 385-394 (1975).
Blevins et al., Advanced Control Unleashed, ISA, ISBN 1-55617-815-8 (2003).
Böling et al., "Multi-Model Control of a Simulated pH Neutralization Process," Proceedings of the 16th IFAC World Congress, 16(1):1-6 (2005).
Cagienard et al., Move Blocking Strategies in Receding Horizon Control, 43rd IEEE CDC, 2:2023-2028 (2004).
Celaya et al., "Closed-Loop Identification at the Hovensa Refinery," Tai-Ji Control, pp. 1-18 (2004).
Chien et al., "Consider IMC Tuning to Improve Controller Performance," *Chemical Engineering Process*, pp. 33-41 (Oct. 1990).
Chiuso, "An Introduction to Subspace Identification," Department of Information Engineering, University of Padova, pp. 1-160 (2005).
Chu et al., "Multistep Model Predictive Control Based on Artificial Neural Networks," *Ind. Eng. Chem. Res.* 42:5215-5228 (2003).
Cutler et al., "Dynamic Matrix Control—A Computer Control Algorithm," *Proc. Automatic Control Conf.*, Paper WP5-B (1980).
Desoer et al., Feedback Systems: Input-output Properties, Academic Press (1975).
Dunia et al., "Graphical MPC for Fast Dynamic Systems," Proceedings of MSEC/ICM&P, pp.1-10 (2008).
Dutta et al., "Application of Neural Network Control to Distillation and an Experimental Comparison with other Advanced Controllers," *ISA Transactions*, 38(3):251-278 (1999).
Garcia et al., "Model Predictive Control: Theory and Practice—a Survey," *Automatica*, 25(3):335-348 (1989).
Garcia et al., "Quadratic Programming Solution of Dynamic Matrix Control (QDMC)," *Chem. Eng. Commun.*, 46:73-87 (1986).
Grosdidier et al., "The IDCOM-M Controller," Proceedings of the 1988 IFAC Workshop on Model-Based Process Control, pp. 31-36 (1988).
Guay et al., "Effect of Process Nonlinearity on Linear Quadratic Regulator Performance," *Journal of Process Control*, 15:113-124 (2005).
Guzman et al., "Interactive Teaching of Constrained Generalized Predictive Control," IEEE Control Systems Magazine, pp. 1-31 (2005).
Hahn et al., "A Gramian Based Approach to Nonlinearity Quantification and Model Classification," *Ind. Eng. Chem. Res.*, 40:5724-5731 (2001).
Hahn et al., "A Method for Robustness Analysis of Controlled Nonlinear Systems," *Chemical Engineering Science*, 59:4325-4338 (2004).
Hahn et al., "Adaptive IMC Control for Drug Infusion for Biological Systems," *Control Engineering Practice*, 10:45-56 (2002).
Hahn et al., "Controllability and Observability Covariance Matrices for the Analysis and Order Reduction of Stable Nonlinear Systems," *Journal of Process Control*, 13:115-127 (2003).
Han et al., "Adapt the Stead-State Kalman Gain using the Normalized Autocorrelation of Innovations," Signal Processing Letters, IEEE, 12(11):780-783 (2002).
Hu et al., "An LMI Approach to Robust Model Predictive Sampled-data Control for Linear Uncertain Systems," *Proceedings of the American Control Conference*, 1(8):628-633 (2002).
Hugo, "Limitations of Model Predictive Controllers," Hydrocarbon Proceedings, pp. 83-88 (2000).
Ingimundarson et al., "Performance Comparison Between PID and Dead-Time Compensating Controllers," *Journal of Process Control*, 12(8):887-895 (2002).
International Preliminary Report on Patentability for Application No. PCT/US2009/032650, dated Aug. 3, 2010.
International Preliminary Report on Patentability for Application No. PCT/US2010/022934, dated Aug. 2, 2011.
International Search Report and Written Opinion for Application No. PCT/US2010/022934, dated Jun. 29, 2010.
International Search Report for Application No. PCT/US2009/032650, dated Oct. 7, 2009.
Jelali, "An Overview of Control Performance Assessment Technology and Industrial Applications," *Control Engineering Practice*, 14:441-466 (2006).
Kalman, "A New Approach to Linear Filtering and Prediction Problems," *J. Basic Eng.*, 82(1):35-45 (1960).
Kesevan et al., "Diagnostic Tools for Multivariable Model-Based Control Systems," *Ind. Eng. Chem. Res.*, 36(7):2725-2738 (1997).
Ko et al., "State Estimation of Linear Systems with State Equality Contraints," IFAC (2005).
Lee et al., "Receding Horizon Output Feedback Control for Linear Systems with Input Saturation," Proceedings of the 39th IEEE, pp. 656-661 (Dec. 2000).
Lee et al., "State Space Interpretation of Model Predictive Control," *Automatica*, 30(4):707-717 (1994).
Li et al., "A State Space Formulation for Model Predictive Control," AIChE Journal, 35(2):241-249 (Feb. 1989).
Lundstrom et al., "Limitations of Dynamic Matrix Control," *Computers in Chemical Engineering*, 19:409-421 (1995).
Maciejowski, Predictive Control with Constraints, Prentice Hall, Shell Oil Fractioner, pp. 248 (2002).
Marquis et al., "SMOC, a Bridge Between State Space and Model Predictive Controllers: Application to the Automation of a Hydrotreating Unit," Proceedings of the 1988 IFAC Workshop on Model-Based Process Control, pp. 37-43 (1988).
Marsik et al., "Application of Identification-Free Algorithms for Adaptive Control," *Automatica*, 25(2):273-277 (1989).
McMillan, "Effect of Sample Delay on Standard PID Tuning and Loop Performance," Fisher-Rosemount Systems, pp. 1-17 (2008).
McMillan, Implementing MPC to Reduce Variability by Optimizing Control Valve Response (2005).
Milman et al., "Guaranteed Bounds on the Performance Cost of a Fast Real-Time Suboptimal Constrained MPC Controller," 43rd IEEE Conference on Decision and Control, pp. 1-6 (Dec. 2004).
Morari et al., Model Predictive Control Toolbox User's Guide (1998).
Muske et al., "Disturbance Modeling for Offset-Free Linear Model Predictive Control, " *Journal of Process Control*, 12:617-632 (2002).
Muske et al., "Model Predictive Control with Linear Models," *AIChE J.*, 39(2):262-287 (1993).
Na, "Auto-Tuned PID Controller Using a Model Predictive Control Method for the Steam Generator Water Level," IEEE Transactions on Nuclear Science, 48(5):1664-1671 (Oct. 2001).
Nagamune et al., "Sensitivity Shaping in Feedback Control and Analytic Interpolation Theory," Optimal Control and Partial Differential Equation Conference, pp. 1-12 (Apr. 2000).
O'Dwyer, "PI and PID Controller Tuning Rules for Time Delay Processes: A Summary," Dublin Institute of Technology (2000).
Odelson et al., "A New Autocovariance Least-Squares Method for Estimating Noise Covariances," TWMCC, Technical Report No. 2003-04, pp. 1-13 (2003).
Odelson et al., "Online Monitoring of MPC Disturbance Models using Closed-Loop Data," Proceedings of the American Control Conference, pp. 2714-2719 (2003).
Olsen et al., "Lambda Tuning as a Promising Controller Tuning Method for the Refinery," AiChE Spring National Meeting, pp. 1-8 (Mar. 2002).
Onodera et al., "A New Subspace Identification Method for Closed-Loop Systems," Seminar, pp. 1-36 (Aug. 2005).
Otto, "Forward Modeling Controllers: A Comprehensive SISO Controller," AlChe Meeting (1986).
Padhiyar et al., "Nonlinear Inferential Multi-Rate Control of Kappa Number at Multiple Locations in a Continuous Pulp Digester," *Journal of Process Control*, 16(10):1037-1053 (2006).
Pannocchia et al., "A Candidate to Replace PID Control: SISO Contraint LQ Control," DYCOPS Proceedings (2004).
Pannocchia et al., "Disturbance Models for Offset-Free Model-Predictive Control," AlChE Journal, 49(2):426-437 (Feb. 2003).
Pannocchia et al., "Offset-Free Control of Constrained Linear Discrete-Time Systems Subject to Persistent Unmeasured Disturbances," 42nd IEEE Conference on Decision and Control (2003).
Patwardhan et al., "From Data to Diagnosis and Control Using Generalized Orthonormal Basis Filters. Part I: Development of State Observers," *J. Process Control*, 15 (2005).

Piche et al., "Nonlinear Model Predictive Control Using Neural Networks," Pavilion Technologies, Inc. Brochure (1992).

Pluymers et al., "Robust Polyhedral Invariant Sets and Their Application in MPC," 24th Benelux Meeting on Systems and Control (2005).

Prett et al., "Optimization and Constrained Multivariable Control of a Catalytic Cracking Unit," Proceedings of the Joint Automatic Control Conference (1980).

Qin et al., "A Survey of Industrial Model Predictive Control Technology," *Control Engineering Practice*, 11(7):733-764 (2003).

Qin, "An Overview of Industrial MPC," (1996). Retrieved from the Internet on Jul. 13, 2005: URL:http://www.che.utexas.edu/~qin/cpcv/node1.html.

Richalet et al., "Model Predictive Heuristic Control: Applications to Industrial Processes," *Automatica*, 14:413-428 (1978).

Ricker, "Decentralized Control of the Tennessee Eastman Challenge Process," *J. Proc. Cont.*, 6(4):205-221 (1996).

Rivera et al., "Internal Model Control. 4. PID Controller Design," *Ind. Eng. Chem. Process Des. Dev.*, 25(1):252-265 (1986).

Schei, "On-Line Estimation of Process Control and Optimization Applications," 8th International IFAC Symposium on Dynamics and Control of Process Systems, 2.

Seborg et al., "Controller Design Method," Process Dynamics and Control, 27.4, pp. 656-669 (1989).

Shinskey, "Evaluating Feedback Controllers: A Challenge for Vendors," Control Engineering, Table of Contents Only (1994).

Shinskey, "PID-Deadtime Control of Distributed Processes," *Control Engineering Practice*, 9(11):1177-1183 (2001).

Shinskey, "Process Control: As Taught vs. As Practiced," *Ind. Eng. Chem. Res.*, 41:3745-3750 (2002).

Shinskey, "Putting Controllers to the Test," *Chemical Engineering*, pp. 96-106 (Dec. 1990).

Shinskey, Feedback Controllers for the Process Industries, McGraw Hill (1994).

Shridar et al., "A Tuning Strategy for Unconstrained Multivariable Model Predictive Control," *Ind. Eng. Chem. Res.*, 37(10):4003-4016 (1998).

Simon, "Kalman Filtering with State Constraints: How an Optimal Filter Can Get Even Better," pp. 1-41 (Jan. 2008).

Skogestad, "Simple Analytic Rules for Model Reduction and PID Controller Tuning," *J. Process Control*, 13:291 (2003).

Soroush et al., "Analytical Model Predictive Control," *Progress in Systems and Control Theory*, 26:163-179 (2000).

Stanfelj et al., "Monitoring and Diagnosis of Process Control Performance: The Single Loop Case," *Ind. Eng. Chem. Res.*, 32:301-314 (1993).

Takahashi et al., Control and Dynamic Systems, Addison-Wesley (1972).

Theile et al., Acheiving Nonlinear MPC Performance with Neural Network Aided State Update, ISA (2004).

Thiele et al., "Multi Model Adaptive Industrial MPC Controller," Proceedings Control and Applications, 568-059:141-146 (2007).

Thiele et al., Autotuning in Distributed Environment, ISA (1999).

Thiele, Benefits and Challenges of Implementing Model Predictive Control as a Function Block, ISA (2000).

Trierweiler et al., "RPN Tuning Strategy for Model Predictive Control," *J. of Process Control*, 13(7):591-598 (2003).

Wojszins et al., "Evaluating PID Adaptive Techniques for Industrial Implementation," *Proceedings of the American Control Conference*, 2:1151-1155 (2002).

Wojszins et al., "Practical Approach to Tuning MPC," *ISA Transactions*, 42(1):149-162 (2003).

Yoshida, "Health Monitoring Algorithm by the Monte Carlo Filter Based on Non-Gaussian Noise," *Journal of Natural Disaster Science*, 24(2):101-107 (2002).

* cited by examiner

MODEL PREDICTIVE CONTROLLER WITH TUNABLE INTEGRAL COMPONENT TO COMPENSATE FOR MODEL MISMATCH

RELATED APPLICATIONS

This application is a regularly filed application from, and claims priority to and the benefit of the filing date of U.S. Provisional Patent Application No. 61/149,147, entitled "Model Predictive Controller with Tunable Integral Component to Compensate for Model Mismatch," which was filed on Feb. 2, 2009, the entire disclosure of which is hereby expressly incorporated by reference herein.

TECHNICAL FIELD

This application relates to process control performed in, for example, an industrial process plant, and, more particularly, relates to an improved model predictive controller that uses a tunable integration component to compensate for model mismatch, which thereby provides for better model predictive controller operation in the presence of model mismatch.

DESCRIPTION OF BACKGROUND TECHNOLOGY

Process control hardware and software is a major component of almost all installations of chemical, pharmaceutical and refining industries, and is a multi-billion dollar business worldwide. Although obtaining the best possible control in any particular instance has not always been a major focus in the past, in recent years, new plants, such as industrial process plants, are increasingly being designed with controllability and optimizability in mind. Moreover, many existing process plants are being renovated with this objective. This renovation includes not only the renovation of the geometry of the installed hardware, such as the locations of reactors, tanks, pipes, etc., but also renovation of the locations of and types of control, monitoring and measurement elements used to perform process control. With the increasing cost of natural resources and the effective costs associated with emissions, energy consumption has also become a significant factor in plant design.

Control performance monitoring, in combination with controller retuning or model scheduling, can dramatically improve the efficiency of industrial plants and thereby save millions of dollars annually. Another technique that has become increasingly popular in the recent years is abnormal situation monitoring and prevention (ASP). In some cases, modern device and control system designs include novel sensors and embedded statistical algorithms that are able to predict potential failures or upcoming maintenance cycles. These predictive maintenance systems can dramatically increase the uptime of plant operations and prevent costly and dangerous manifestations of unexpected shutdowns. Moreover, the reliability of these techniques has significantly increased in the last decade, leading to increased plant efficiencies.

As part of these efforts, a class of predictive control techniques, generally referred to as model predictive control (MPC) techniques, has gained significant acceptance in the industry since first being developed and applied about 25 years ago. Generally speaking, MPC refers to a class of control algorithms that compute a manipulated variable profile by utilizing a process model (which is typically linear in nature) to optimize a linear or quadratic open-loop performance objective, subject to constraints, over a future time horizon. The first move of this open loop, optimal manipulated variable profile is then implemented within the process, and the procedure is repeated at each control interval or controller cycle to perform process control. Process measurements are used to update the optimization problem during ongoing control. This class of control algorithms is also referred to as receding horizon control or moving horizon control.

However, due to its complexity, MPC has established its place mainly in the advanced control community, and thus MPC configurations are typically developed and commissioned by control experts. As a result, MPC implementations have usually only been worthwhile to apply on processes that promise large profit increases in return for the large cost of implementation. Here, the scale of MPC applications in terms of the number of inputs and outputs has usually been large, which is one reason why MPC has not typically been used in low-level, loop control such as single variable loop control.

More specifically, the commissioning costs of a control system are substantial, and it is rarely practical to pay detailed attention to the configuration of every control loop in a particular process plant. As a result, about 90 percent of all control loops are controlled by traditional linear feedback controllers, such as proportional-integral-derivative (PID) controllers or proportional-integral (PI) controllers. Moreover, to the extent that MPC controllers are used, these controllers are also typically linear in nature. Unfortunately, while linear controllers are predominantly used in the process control industry, the majority of real processes exhibit non-linear behavior. The consequence of this discrepancy is that model mismatch is unavoidable. Unaddressed model mismatch not only results in suboptimal control performance, but also nullifies many of the advantages of the technologies that have been developed to improve control performance and uptime. Model mismatch is therefore not only costly in terms of the control hardware and software, but actually diminishes the cost savings of other related plant technologies.

Generally speaking, the performance of industrial controllers can be measured in various ways, and different processes may have greatly different quality and safety requirements. Plant engineers may in fact use one or many different performance criteria, such as overshoot, arrest time (integrating processes), oscillation characteristics, integrated error and integrated absolute error (IAE) to evaluate the performance of a particular control loop. However, for PID controllers, the measured control performance for a given controller is typically a result of a tradeoff between set point tracking and disturbance rejection behavior, with better performance in set point tracking resulting in worse performance in disturbance rejection, and vice versa. For example, long time constants (i.e., such as those present in lag dominant processes) are known to cause poor disturbance rejection performance in PID controllers that are tuned for set point tracking performance. This tradeoff, which is inherent in the development of PID controllers, can be explained by the fact that a PID controller that is ideally tuned for load disturbance rejection must have a relatively high integral action (i.e., a relatively small integral time constant), and that high integral action is detrimental to the set point change performance of the controller. More particularly, during a set point change, the process error (e) remains large for a period of time even while the controlled variable (y) is approaching the set point (SP). With very large integral gain, the integral term builds up fast, and more than necessary, thus causing set point overshoot. Consequently, PID tuning targeted for set point change performance has smaller integral action and worse load change or disturbance rejection performance. Because traditional PID control, which as noted above, is still the most popular controller choice in all industries, suffers this problem, many approaches have been suggested in an attempt to reduce the effects of this issue, including structural modifications to the PID controller and set point filtering.

However, even with these modifications, tuning of PID controllers still presents the challenge of correctly specifying the tradeoff between set point tracking and disturbance rejection performance. Different PID tuning methods typically favor one of set point tracking performance or disturbance rejection performance over the other. Moreover, many model based tuning techniques match the internal parameters of a PID controller to internal parameters of a model for the process being controlled, resulting in this same tradeoff. For example, PID tuning methods, such as pole cancellation and lambda tuning, match the integral time of the controller to the dominant time constant of the process. Here, the controller gain is set to achieve a certain closed loop time constant and a certain set point change response (e.g. no overshoot). Because the resulting integral action of such controllers is relatively small, this technique exhibits very good set point change performance, but poor disturbance rejection performance. On the other hand, empirical PID tuning methods such as Ziegler-Nichols methods are specifically designed for disturbance rejection performance. However, because the integral action of such controllers is strong enough to return the process variable to the set point very quickly, it leads to undesired set point overshoot in response to set point changes.

In rare occasions, the purpose of a loop is only disturbance rejection (e.g., a buffer tank level with no set point changes) or only set point tracking (e.g., a secondary loop in a cascade strategy with no disturbances). While in those cases it may be easy to choose a tuning configuration, the aforementioned tradeoff is frequently overlooked entirely and, instead, a default tuning method is typically chosen, making the tuning less than optimal in any particular process situation. As noted above, while numerous tuning methods have been developed to overcome this limitation of PID tuning, including set point filtering and two degree of freedom structures, these tuning methods typically favor disturbance rejection performance, and thus the controller reaction to set point changes is artificially reduced. For example, if set point filtering is chosen, set point changes by the operator are filtered to prevent overshoot, resulting in slower reaction to set point changes.

In any event, a direct outcome of the performance tradeoff discussed above is that different tuning methods have to be chosen for different control objectives, which is one of the reasons why so many tuning methods have been proposed for PID tuning. Another reason for the availability of so many PID tuning techniques is that different tuning rules or methods use different input variables, only some of which may be readily available in any particular process. For example, while many tuning methods calculate tuning based on a process model, other methods calculate tuning based on other process characteristics. As an example of this later method, Ziegler-Nichols tuning rules use critical gain and critical frequency, which may be easy to determine for some mechanical processes, but cannot be practically determined in many industrial chemical processes.

On the other hand, a predictive controller such as an MPC controller should be able to perform similarly for set point changes and load changes because the integral part of an MPC controller does not suffer the same tradeoff as observed for PID controllers. More particularly, MPC controllers generally do not exhibit a performance tradeoff between set point tracking and disturbance rejection because the terms for the error and move penalties are inherently separate, theoretically making MPC controllers a desirable substitute to PID controllers. Also, in a predictive controller, the error (e) does not increase while the controlled variable or process output (y) is approaching the set point. In fact, the error can theoretically be zero after the first execution cycle, thereby decreasing or eliminating the integral gain problems inherent in PID control. Unfortunately, performance of an MPC controller can fall off rapidly when process model mismatch is present, i.e., when the process model being used by the MPC controller does not perfectly match the actual process characteristics.

Still further, it is known that the disturbance rejection performance of industrial MPC controllers lags behind that of PID controllers when PID controllers are specifically tuned for disturbance rejection. Recent MPC improvements in the area of state update have closed this performance gap somewhat if an observer model used in the MPC technique is assumed to be known perfectly. However, in the presence of model mismatch, the control performance of a PID controller, as measured by the integrated absolute error (IAE), is still better than that of an MPC controller with the best possible tuning.

None-the-less, MPC has been considered as one of the prime control technologies to be used in replacing PID controllers as MPC controllers are believed to be able to combine the benefits of predictive control performance and the convenience of only a few more or less intuitive tuning parameters. However, at the present time, MPC controllers generally have only succeeded in industrial environments where PID control performs poorly or is too difficult to implement or maintain, despite the fact that academia and control system vendors have made significant efforts in recent years to broaden the range of MPC applications. Basically, because PID control still performs better than MPC for a significant number of processes, and because PID controllers are cheaper and faster to deploy than MPC type controllers, MPC controllers have actually replaced only a small fraction of PID controllers within actual process plant configurations.

One of the main reasons why MPC controllers tend to perform worse than PID controllers is that, as indicated above, MPC controllers are more susceptible to performance degradation as a result of process model mismatch than PID controllers (except possibly in lag dominant processes). While there are practical ways to address the model mismatch that results from nonlinearities (or other sources) in processes, such as the linearization of the control elements and the transmitters and the use of controller gain scheduling, the most common technique to address model mismatch is to implement controller tuning. Because of the difficulties in tuning controllers, however, process operators or engineers frequently tune a controller for the worst case scenario (e.g. the highest process gain) and accept suboptimal tuning for other regions of the process. The default tuning parameters of an industrial PID or MPC controller are thus typically conservative, so that these tuning parameters can work initially for a variety of process applications. However, controllers are usually left at their default settings indefinitely, resulting in overall poorer performance. Even if this were not the case, the model mismatch that results from identification error or from plant drift is more difficult to address with tuning. In fact, this type of model mismatch is hard to detect because sufficient process perturbation is required to implement model identification, which typically contradicts the objective of process control (i.e., keeping the process at steady state in response to process disturbances). Moreover, it is hard to distinguish process perturbation from unmeasured disturbances.

One method of "tuning" an MPC controller in response to model mismatch is to regenerate the process model in light of process changes and then use this new model within the MPC controller. Unfortunately, there are many practical obstacles to developing an accurate process model for use in model based controllers in the first place. For example, even though many industrial processes are minimum phase, the majority of closed loops are not minimum phase. Time delay, also known as deadtime, and higher order lags create right hand poles which greatly complicates the development of an accurate process model. In most instances, closed loop deadtime is created by transport delay of material in pipes and discrete sampling mechanisms that are unavoidable in computer control systems, while higher order lags are usually a result of filter time constants in measuring and control devices. Other challenges often found in defining process models for industrial plants include resolution and deadband created by the mechanical behavior of valves and packing.

These and other factors present many challenges to control engineers in industrial plants when developing process models for controllers. For example, even if a certain process is expected to act like a first order filter with certain gain and time constant, depending on vessel geometry, the control engineer has to consider additional time constants from transmitters, control elements computer sampling and jitter. In particular, any digital control system has central processing unit (CPU) and communication constraints, which means that ample over-sampling is not practical for all types of loops in a plant. For example, while a sampling rate of three times the largest time constant plus deadtime or five times the deadtime, whichever is larger, is often considered reasonably sufficient, this sampling rate is usually not achievable for many control loops in a plant (such as flow loops and pressure loops). As a result, the engineer can not usually rely solely on the first principle models that may be available for some of the reactions. Moreover, process model identification is ideally performed by integrated automatic tools. However, the first principle modeling and universal third party solutions that are typically used in a real plant to identify a process model do no by connecting directly to the field instruments. These solutions are not therefore integrated because they do not consider (or at best only approximate) the effect of the computer control system itself on loop performance. All of these factors can result in significant mismatch between the process and the process model developed to control the process, making model-based control and tuning methods less desirable in practical situations.

One very important and promising type of MPC controller is that which uses a state update technique or an observer model. There is abundant literature on state update methods used in MPC, and many techniques have been developed that improve the performance of the state update component of a model predictive controller to provide a very responsive MPC controller. However, because model based controller performance can be severely degraded by model mismatch, the majority of efforts to improve control performance in model predictive controllers is focused on improving the performance and precision of state update algorithms that correct for the effects of model mismatch. Another large portion of control literature is concerned with improving initial model quality, adapting process models to process parameter changes, or detecting process parameter changes in order to inform the user and trigger a manual process model reevaluation. Unfortunately, these techniques are not practical in many instances, and few of them make the MPC controller perform comparable to or better than PID controllers in a wide variety of instances.

SUMMARY OF THE DISCLOSURE

It has been determined that deficiencies in the feedback control capabilities of MPC controllers are one reason for the performance gap between PID and MPC controllers, especially in the presence of process model mismatch. Recognizing this fact, an MPC controller described herein integrates tunable feedback control performance better than methods commonly used today in MPC type controllers, resulting in a tunable MPC controller that performs better than traditional MPC techniques in the presence of process model mismatch.

In particular, MPC controller performance is enhanced by adding a tunable integration block to the MPC controller that develops an integral component indicative of the prediction error or other controller error, and that adds this component to the output of the MPC controller algorithm to provide for better control in the presence of model mismatch, which is the ultimate reason for the prediction or control error in the first place. This technique enables the MPC controller to react more quickly, and to provide better set point change and load disturbance performance in the presence of model mismatch, without significantly decreasing the robustness of the MPC controller.

DETAILED DESCRIPTION

Generally speaking, a new tunable MPC controller design is discussed herein that may be applied to various different types of model predictive control (MPC) controllers for use in any desired or appropriate controller setting. However, this new MPC controller method is particularly useful in control systems used in process plants, such as in industrial process plants, like drug and chemical manufacturing plants, refinery plants, etc. Moreover, while the new MPC controller design is described herein as being implemented as part of a distributed process control network, it could also be implemented in other types of control environments including, for example, as a part of a centralized control system, as part of a programmable logic control (PLC) system, as part of a stand-alone control system, etc.

Figure 1:
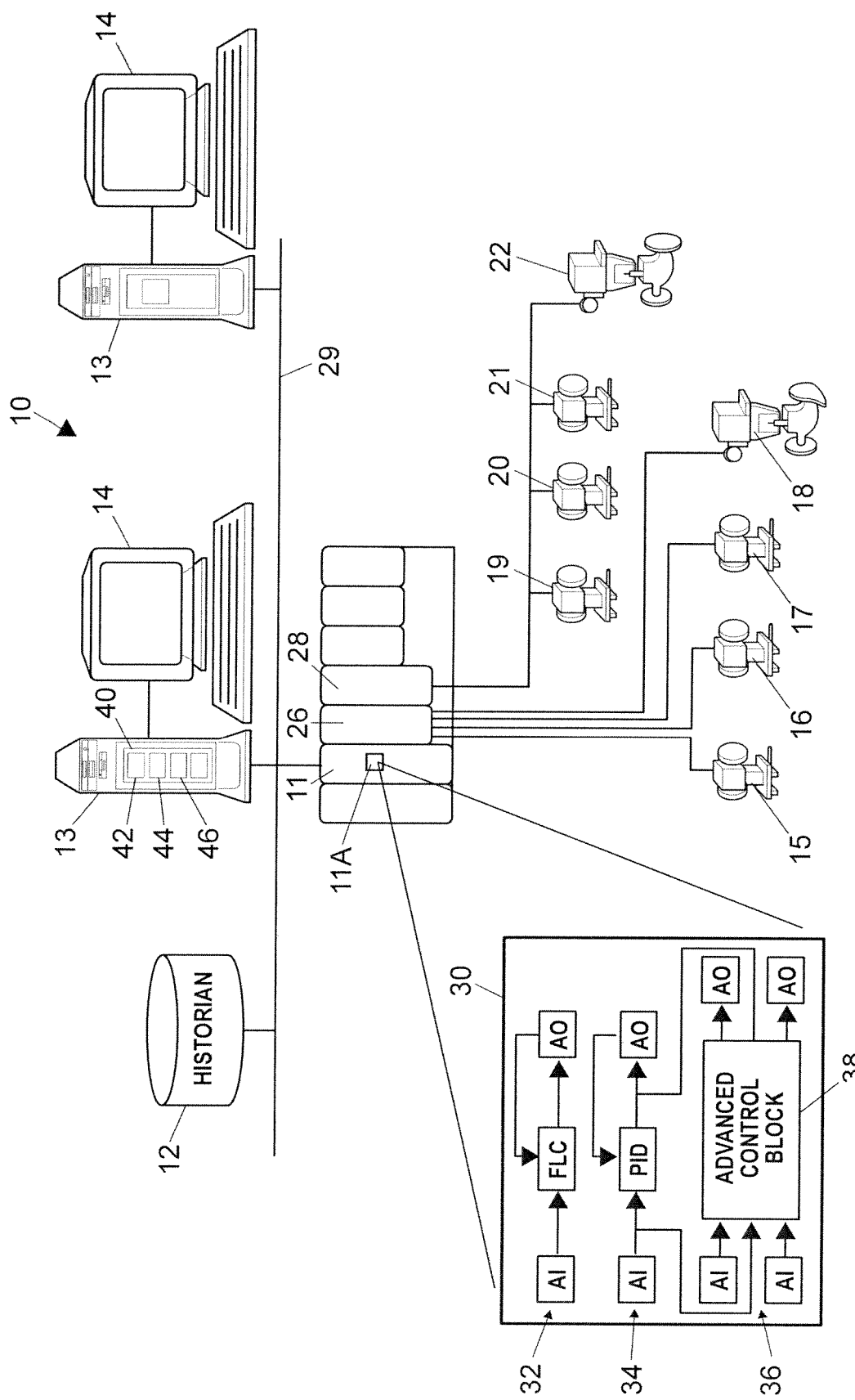
FIG. 1 is a block diagram of a process control system including a control module having an advanced controller function block that implements an MPC controller.

Referring now to FIG. 1, a process control system 10 in which the new MPC controller technique described herein may be implemented includes a process controller 11 communicatively connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example only, the DeltaV™ controller sold by Emerson Process Management, is communicatively connected to the host computers 13 and the data historian 12 via, for example, an Ethernet connection or any other desired communication network 29. The communication network 29 may be in the form of a local area network (LAN), a wide area network (WAN), a telecommunications network, etc. and may be implemented using hardwired or wireless technology. The controller 11 is communicatively connected to the field devices 15-22 using any desired hardware and software associated with, for example, standard 4-20 ma devices and/or any smart communication protocol such as the FOUNDATION® Fieldbus protocol (Fieldbus), the HART® protocol, the WirelessHART™ protocol, etc.

The field devices 15-22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15-18 are standard 4-20 ma devices or HART® devices that communicate over analog lines or combined analog/digital lines to the I/O card 26, while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols that now exist or that are developed in the future. Likewise, the communications between the field devices 15-22 could be implemented using wired, wireless or a combination of wired and wireless technology, if so desired.

The controller 11, which may be one of many distributed controllers within the plant 10, has at least one processor 11A therein that implements or oversees one or more process control routines, which may include control loops, stored therein or otherwise associated therewith. The controller 11 also communicates with the devices 15-22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium so as to be executable by a processor, such as a CPU of a computer device. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software, hardware, or firmware programming or design tools. Thus, the controller 11 may be generally configured to implement a control strategy or control routine in any desired manner.

In one embodiment, the controller 11 implements a control strategy using what are commonly referred to as function blocks, wherein each function block is apart of or an object of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that perform is PID, MPC, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART® devices, or may be stored in and implemented by the field devices themselves, which may be the case with FOUNDATION® Fieldbus devices. Still further, function blocks which implement controller routines, such as the tunable MPC controller routine or technique described herein, may be implemented in whole or in part in the host workstations or computers 13 or in any other computer device. While the description of the control system is provided herein using a function block control strategy which uses an object oriented programming paradigm, the control strategy or control loops or modules could also be implemented or designed using other conventions and using any desired programming language or paradigm.

As illustrated by the expanded block 30 of FIG. 1, the controller 11 may include a number of single-loop control routines, illustrated as routines 32 and 34, and may implement one or more advanced control loops, illustrated as a control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to numerous AI function blocks and outputs communicatively connected to numerous AO function blocks, although the inputs and outputs of the advanced control block 38 may be communicatively connected to any other desired function blocks or control elements to receive other types of inputs and to provide other types of control outputs. Moreover, while the advanced control block 38 is illustrated as implementing multi-variable (e.g., multiple/input multiple/output) control, it could also be used to implement single variable (e.g., single/input single/output) control. As will be described further, the advanced control block 38 may be a control block that integrates a model predictive control (MPC) routine that includes a tunable integration unit to compensate for model mismatch as described herein, to perform better control of the process or a portion of the process in the presence of model mismatch. Moreover, while the advanced control block 38 is described herein as generally including a model predictive control (MPC) block, the advanced control block 38 could actually implement any of many different types of MPC techniques, and can even switch between these techniques in some cases. It will be understood that the control modules illustrated in FIG. 1 or sub-components of these modules, including the advanced control block 38 or components thereof, can be executed by the controller 11 or, alternatively, can be located in and executed by any other processing device, such as one of the workstations 13 or even one of the field devices 19-22. For example, in one embodiment, an MPC controller block 42 may be stored in and may be executed on the computer 13 to provide output or control signals to the advanced control block 38 executed in the controller 11.

As illustrated in FIG. 1, one of the workstations 13 includes an advanced control block generation routine 44 that is used to create, download and implement the advanced control block 38. While the advanced control block generation routine 44 may be stored in a memory within the workstation 13 and executed by a processor therein, this routine (or any part thereof) may additionally or alternatively be stored in and executed by any other device within the process control system 10, if so desired. Still further, a user interface routine 46 may allow a user, such a process operator, a control engineer, etc. to specify or change tuning, design or control parameters associated with the advanced control block 38, to change set points, to initiate a tuning procedure, to provide new model parameters, etc.

As way of background, many industrial implementations of MPC techniques include model algorithmic control (MAC) techniques and dynamic matrix control (DMC) techniques. DMC technology uses linear step response or impulse response models of the process and, in this case, the optimal control path is pre-calculated off-line and is stored in a large matrix. This controller matrix is then used to compute the on-line moves of the manipulated variables by superposition. As a result, computational cost is reduced drastically in comparison to MPC methods that solve optimal equations on-line. Another advantage of DMC technology is that a state variable used therein is calculated intuitively from the process model, and represents the explicit future output prediction, which means that future predictions of process outputs, such as variables associated with constraints, are readily available and can be displayed to the user.

Other MPC implementations include IDCOM and linear dynamic matrix control (LDMC), which uses a linear objective function and incorporates constraints explicitly, quadratic dynamic matrix control (QDMC), which is an extension of DMC incorporating a quadratic performance function and is explicit in the incorporation of constraints, IDCOM-M, which is an extension of IDCOM using a quadratic programming algorithm to replace the iterative solution technique of the original implementation, and Shell multivariable optimizing control (SMOC), which is a state-space implementation. Another class of MPC techniques uses a state observer to provide better MPC performance.

Figure 2:
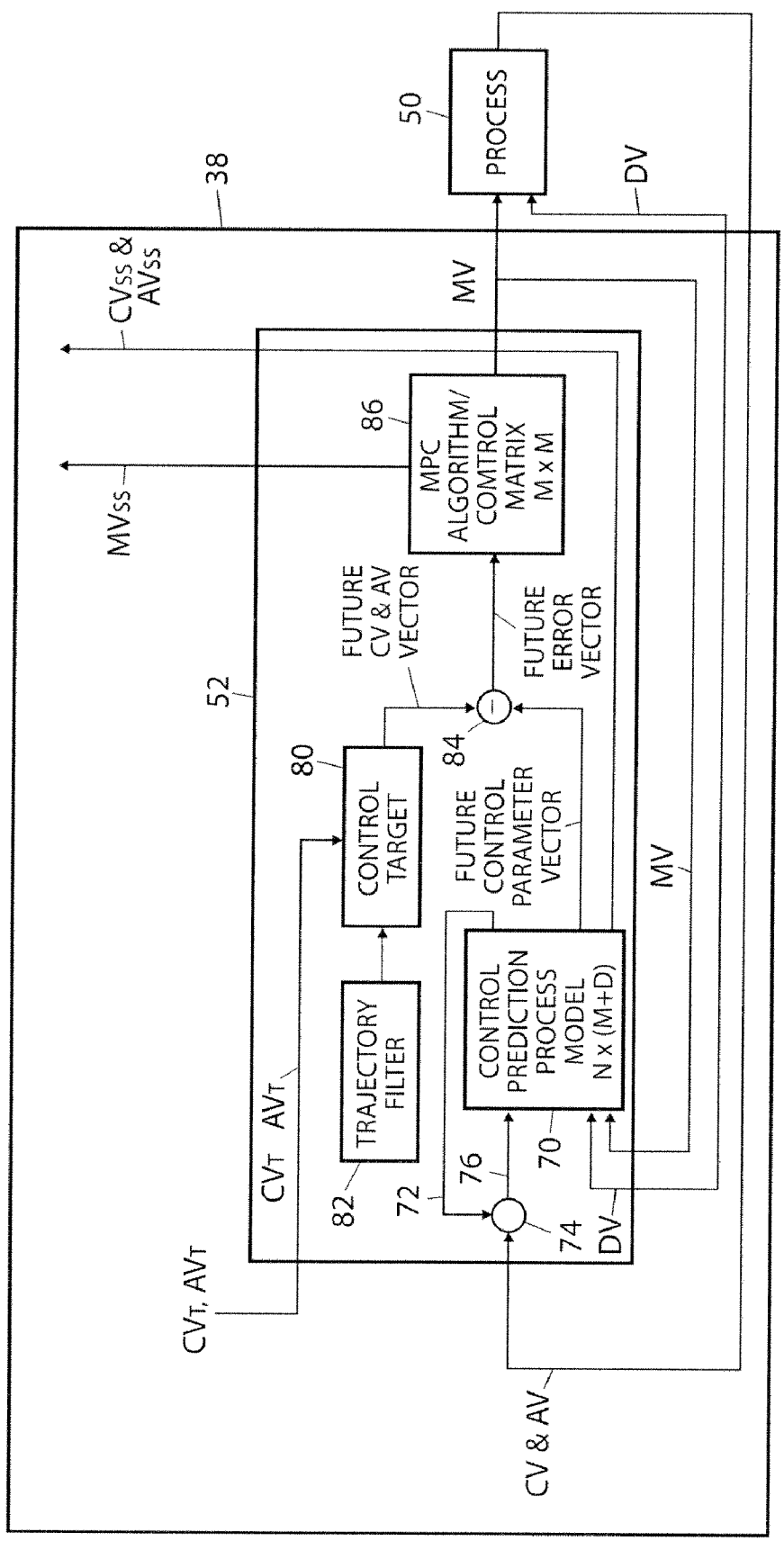
FIG. 2 is a block diagram of a typical MPC controller.

FIG. 2 illustrates a detailed block diagram of one embodiment of a multi-variable MPC controller unit 52 (communicatively coupled to the process 50) that may be implemented by the advanced control block 38 of FIG. 1 to perform multivariable process control. In this case, the MPC controller 52 unit may be used to implement a DMC control technique. However, this discussion provides a good basis for a generalized understanding of MPC control. As shown in FIG. 2, the advanced control block 38 produces a set of manipulated variables (MVs) that are provided to other function blocks which, in turn, are connected to control inputs of the process 50. As illustrated in FIG. 2, the advanced control block 38 includes the MPC controller block 52 which may include or implement any standard MPC routine or procedure, typically having the same number of inputs as outputs, although that requirement is not necessary. The MPC controller 52 receives, as inputs, a set of N controlled variables (CVs) and auxiliary variables (AVs), which typically constitute vectors of values, as measured within the process 50, a set of disturbance variables (DVs), which are known or expected changes or disturbances provided to the process 50 at some time in the future, and a set of steady state target control and auxiliary variables ($CV_T$) and ($AV_T$) provided from, for example, an optimizer (not shown), a user or any other source. The MPC controller 52 uses these inputs to create the set of M manipulated variable (MV) signals in the form of control signals and delivers the manipulated variable signals MV to the control inputs of the process 50, which may be inputs related to the operation of valve actuators, burners, pumps, etc.

Still further, the MPC controller 52 calculates and produces a set of predicted steady state control variables ($CV_{SS}$) and auxiliary variables ($AV_{SS}$) along with a set of predicted steady state manipulated variables ($MV_{SS}$) representing the predicted values of the control variables (CVs), the auxiliary variables (AVs) and the manipulated variables (MVs), respectively, at a control horizon. These variables may be used in one or more MPC optimization routine(s) to develop the target control and auxiliary variables $CV_T$ and $AV_T$ in order to drive the process 50 to an optimal operating state.

No matter how developed, the target control and auxiliary variables $CV_T$ and $AV_T$ are provided as inputs to the MPC controller 52 which, as noted previously, uses these target values $CV_T$ and $AV_T$ to determine a new set of steady state manipulated variables $MV_{SS}$ (over the control horizon) which drives the current control and manipulated variables CV and AV to the target values $CV_T$ and $AV_T$ at the end of the control horizon. Of course, as is known, the MPC controller 52 changes the manipulated variables in steps in an attempt to reach the steady state values for the steady state manipulated variables $MV_{SS}$ which, theoretically, will result in the process obtaining the target control and auxiliary variables $CV_T$ and $AV_T$. Because the MPC controller 52 operates as described above during each process scan, the target values of the manipulated variables may change from scan to scan and, as a result, the MPC controller 52 may never actually reach any particular one of these sets of target manipulated variables MV, especially in the presence of noise, unexpected disturbances, changes in the process 50, etc.

As is known, the MPC controller 52 includes a control prediction process model 70 (also called a "controller model"), which may be any type of model used in any of the various different MPC control techniques. For example, the model 70 may be an N by M+D step response matrix (where N is the number of control variables CV plus the number of auxiliary variables AV, M is the number of manipulated variables MV and D is the number of disturbance variables DV). However, the model 70 may be a first order, a second order, a third order, etc. predictive or first principles model, a state-space model, a convolution process model, or any other type of process model. The controller model 70 may be determined from process upset tests using time series analysis techniques that do not require a significant fundamental modeling effort, or may be determined using any other known process modeling techniques, including those which superimpose one or more sets of linear models or non-linear models. In any event, the control prediction process model 70 produces an output 72 defining a previously calculated prediction for each of the control and auxiliary variables CV and AV and a vector summer 74 subtracts these predicted values for the current time from the actual measured values of the control and auxiliary variables CV and AV to produce an error or correction vector (also known as residuals) on the input 76. This error is typically referred to as the prediction error.

The control prediction process model 70 then predicts a future control parameter for each of the control variables and auxiliary variables CV and AV over the control horizon based on the disturbance and manipulated variables provided to other inputs of the control prediction process model 70. The control prediction process model 70 also produces the predicted steady state values of the control variables and the auxiliary variables $CV_{SS}$ and $AV_{SS}$ discussed above.

A control target block 80 determines a control target vector for each of the N target control and auxiliary variables $CV_T$ and $AV_T$ provided thereto by the target conversion block 55 using a trajectory filter 82 previously established for the block 38. In particular, the trajectory filter 82 provides a unit vector defining the manner in which control and auxiliary variables are to be driven to their target values over time. The control target block 80 uses this unit vector and the target variables $CV_T$ and $AV_T$ to produce a dynamic control target vector for each of the control and auxiliary variables defining the changes in the target variables $CV_T$ and $AV_T$ over time period defined by the control horizon time. A vector summer 84 then subtracts the future control parameter vector for each of the control and auxiliary variables CV and AV from the dynamic control vectors to define a future error vector for each of the control and auxiliary variables CV and AV. The future error vector for each of the control and auxiliary variables CV and AV is then provided to an MPC algorithm 86 which operates to select the manipulated variable MV steps that minimize, for example, the least squared error or integrated absolute error (IAE), over the control horizon. In some embodiments, the MPC control algorithm 86 may use an M by M control matrix developed from relationships between the N control and auxiliary variables input to the MPC controller 52 and the M manipulated variables output by the MPC controller 52 if desired. More particularly, the MPC control algorithm 86 has two main objectives. First, the MPC control algorithm 86 tries to minimize CV control error with minimal MV moves, within operational constraints and, second, tries to achieve optimal steady state MV values and the target CV values calculated directly from the optimal steady state MV values.

The state equations for a typical model predictive controller may be expressed as:

$$\hat{x}_{k+1} = Ax_k + Bu_k \quad k = 0, 1, 2, \ldots \quad (1)$$

$$\hat{y}_k = C\hat{x}_k \quad (2)$$

$$\min_{u^N} \sum_{j=0}^{\infty} (y_{k+j}^T Q y_{k+j} + u_{k+j}^T R u_{k+j} + \Delta u_{k+j}^T S \Delta u_{k+j}) \quad (3)$$

where Q, R, S are the penalty weights for error, controller move and incremental move, respectively, $x_k$ is the model state matrix, $y_k$ is the process output and $u_k$ is the controller output. Because the Q, R and S penalty vectors are inherently separate, MPC controllers generally do not have a performance tradeoff between set point tracking and disturbance rejection. However, MPC controllers still need to be tuned for a specific multivariable process control objective. While the process model is always matched with the internal structure of an MPC controller (e.g., process state space with the state space MPC formulation), additional tuning parameters determine the behavior with respect to set point change and disturbance rejection.

In particular, the penalty vectors can be used to emphasize one variable over others in accordance with the control objective for the specific process as defined by the end user. If model mismatch is suspected, the penalty vectors Q and R can also be used to make the controller more robust (i.e., to detune the controller). However, methods such as funnel control or reference trajectory have a more obvious impact on robustness as they effectively filter the error vector, which is why these methods are the preferred means for engineers and operators to tune model predictive controllers in industrial process applications. Because a model predictive controller inherently "matches" the process, the control moves are always optimal for the specific process model. This fact means that the controller can only be detuned (according to physical limitations on the final control elements) and never tuned very aggressively. For example, a valve opening speed can never be infinite and, therefore, the value of R can never realistically be zero. It is known that the disturbance rejection of industrial MPC controllers lags behind that of PID controllers when PID controllers are specifically tuned for disturbance rejection. Recent MPC improvements in the area of state update have closed that performance gap if an observer model which is used in the MPC routine is assumed to be known perfectly. However, in the presence of model mismatch, the control performance (e.g., measured in IAE) of a PID controller is still better than that of an MPC controller with the best possible tuning. None-the-less, MPC techniques with an observer can be used to improve the feedback control performance and typically perform better than DMC techniques in this regard.

Figure 3:
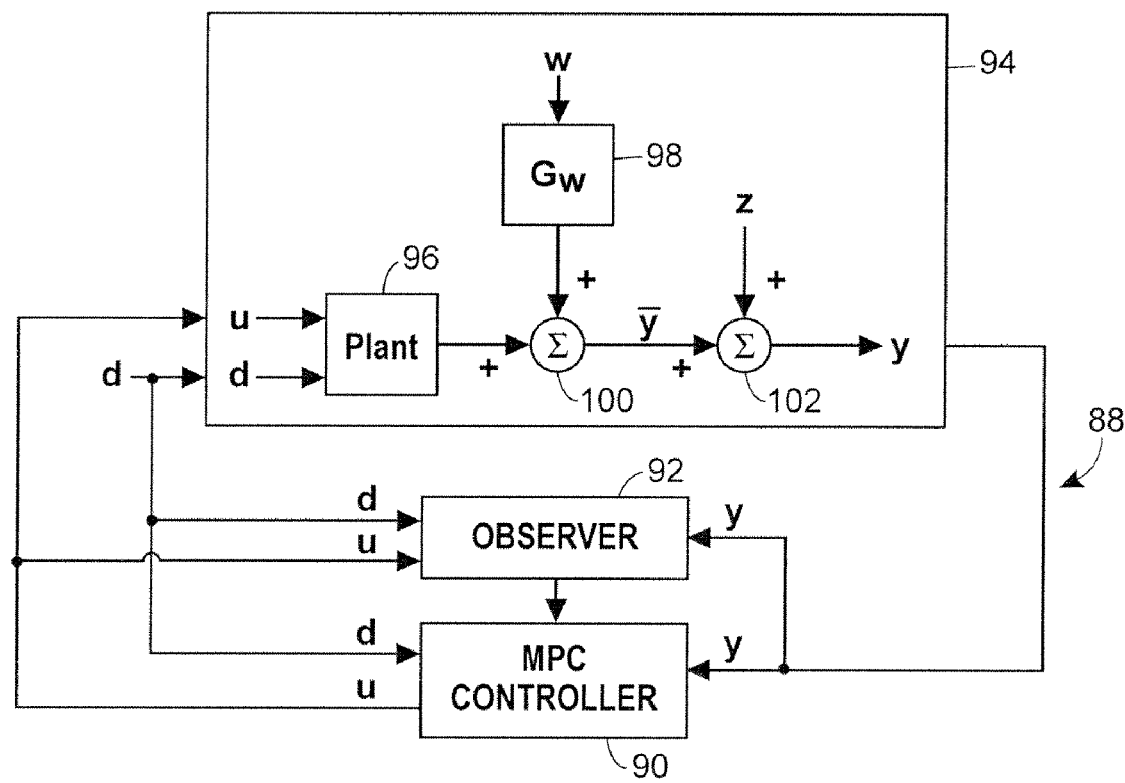
FIG. 3 is a block diagram of a typical MPC controller unit, having an MPC controller and a state observer, connected to control a process plant.

An example of an observer based MPC controller system 88 is illustrated in FIG. 3. Here, the MPC controller system 88 includes an MPC controller 90 and an observer 92 which, in this case, is assumed to be a Kalman filter. The MPC controller 90 provides control signals u to a process plant 94 and to the Kalman filter 92. Moreover, the MPC controller and the Kalman filter 92 receive disturbance inputs d which are also provided to or present in the process plant 94, and receive feedback from the plant 94 in the form of measured controlled variables y. The process plant 94 is illustrated in FIG. 3 in modeled form, wherein the plant 94 includes a plant transfer function 96, which receives the control signals u and the disturbance signals d, and various sources of expected errors or disturbances. In particular, a disturbance and noise model 98 (with a transfer function $G_w$) receives noise w (which may be white noise for example), and the output of the noise model 98 is added (in a purely theoretical summer 100) to the output of the plant transfer function 96. The output of the summer 100 is added to measurement errors or measurement noise z in another theoretical summer 102 to produce the measured process outputs y.

In this configuration, the update of the state variable x of a process characterized by a stochastic state-space model can be expressed as:

$$x_{k+1} = Ax_k + Bu_k + w_k \quad (4)$$

$$y_k = Cx_k + n_k \quad (5)$$

for Gaussian distributed process noise $w_k$ and measurement noise $n_k$.

The general objective of state observers, such as the observer 92 of FIG. 3, is to provide an estimate of the internal states of a system based on all measurable system inputs and outputs. In particular, if one of the assumptions of Equations (4) and (5) is that the vectors A, B and C (which model the process) are known exactly, then the observer gains can be computed. The filter formulation developed in the 1960s referred to as the Kalman filter has been the most popular method in process control for estimating internal process states based on noisy or incomplete measurements. For a discrete sampling system that uses the MPC formulation given in Equations (1) to (3), the Kalman filter equation for estimating the next state $x_{k+1}$ is:

$$\hat{x}_{k+1} = A\hat{x}_k + B\hat{u}_k + J(y_k - \hat{y}_k) \quad (6)$$

$$\hat{y}_k = C\hat{x}_k + n_k \quad (7)$$

where J is the Kalman filter gain, $\hat{x}_k$ is the state vector with k state variables, $y_k$ is the predicted process output and $\hat{y}_k$ is the actual value of the process output. If covariances for unmeasured disturbances and measurement noise are known, the general Kalman filter structure can be created by augmenting $G_w$ (disturbance and noise model) to the plant model and then re-computing the MPC controller gain for the augmented model (shown in FIG. 3). The filter gain J can be determined by numerically solving the Riccati equation, where $Q_{KF}$ is the positive semi-definite matrix representing the covariances of the disturbances in w and $R_{KF}$ is the positive definite matrix representing the covariances of the measurement noise z. If the covariances are not known, a simplified version of the Kalman filter can be used. This formulation assumes that the disturbances w are independent and thus each element of the disturbances w affects one (and only one) element of the process outputs y. As a result of this assumption, $Q_{KF}$ and $R_{KF}$, the input and measurement noise covariances, are not required. Instead, this simplification uses a filter time constant $\tau_i$ and an estimate of the signal to noise ratio $SNR_i$ per disturbance to create the disturbance model as follows:

$$G_{w_i}(q) = \frac{1}{q - a_i} \quad (8)$$

wherein $a_i = e^{-T/\tau_i}$, $0 \le \tau_i \le \infty$, and T is the sampling period. As $\tau_i \to 0$, $Gw_i(q)$ approaches a unity gain, while as $\tau_i \to \infty$, $G_{wi}$ becomes an integrator. Element i of $\Delta w$ is a stationary white-noise signal with zero mean and standard deviation $\sigma_{wi}$ (where $w_i(k) = w_i(k) - w_i(k-1)$). Element i of z is a stationary white-noise signal with zero mean and standard deviation $\sigma z_i$.

The objective of state update is to find the best possible estimate of the current state variable at every instance of time (i.e., at every scan period of a discrete controller). However, utilizing the best possible state estimate in a well-tuned MPC controller does not necessarily mean that it will lead to the best possible control performance. In particular, the dynamic behavior of the closed loop feedback path of the state update model depends on the observer gain J. However, because the observer gain J is derived from noise covariance (or signal to noise ratio in the case of a simplified Kalman filter formulation), there is no tuning parameter or generic variable that takes the observer transfer function into account. Therefore, closed-loop control performance may be affected in an undesirable (sub-optimal) way. However, it has been determined that the closed loop responses for a large range of J are very similar for a particular controller situation. Thus, it appears that the value of J only has a very small impact on control performance. Surprisingly, this observation holds true for both a perfect model and in the case of model mismatch. In fact, it has been determined that tuning of move penalties and the error penalties within the observer has a much larger impact on control performance both with and without model mismatch and thus these tuning parameters are typically used in tuning an MPC controller.

Although observers improve MPC feedback performance, they still have assumptions that empirically tuned controllers, such as PID controllers, do not have. Still further, any model-based predictive controller with or without a model-based observer will assume that the model is known perfectly, which is almost never the case in actual process plants. Unfortunately, even small model errors can cause large prediction and state update errors leading to poorer controller performance.

As discussed above, tuning parameters for model predictive controllers are commonly used to adjust the controller behavior in a way that is desirable for a particular plant application. For example, a certain desired speed of response may be set by tuning the move penalties R to a certain value. However, the expected behavior that is designed by the commissioning engineer will only occur if the model mismatch is insignificant, which is rarely the case in industrial plants. To account for the apparent model mismatch, practitioners often resort to iterative tuning until the desired behavior can be observed. This process is costly because it is very time-consuming, and may not be optical because it is difficult to cover all possible control and constraint scenarios on a running plant. Even if this method results in the desired plant behavior for the given model mismatch, the behavior can be expected to change if the magnitude of model mismatch changes. Furthermore, even if the amount of model mismatch and its variation is known, there is no method to derive tuning information from this information.

IMPROVING MPC CONTROL PERFORMANCE IN THE PRESENCE OF MODEL MISMATCH

As is known, the ability to reject load changes, such as unmeasured disturbances, within an MPC controller can be improved with empirical tuning. Of course, the feedback performance of model-based controllers can be tuned to be ideal, and to be as good as the set point change performance if the process or plant model is perfectly known. When there is model mismatch, however, the tuning is typically chosen more conservatively by the engineer. An MPC controller technique described herein offers an alternative to detuning the controller. In particular, if the controller reacts to an increasing accumulation of prediction error, i.e., slope, the controller can account for unmeasured disturbances quicker than standard MPC controllers. As the MPC control equations (1) to (3) illustrate, controller outputs only depend on previous inputs, outputs and set points, not on previous control errors. In fact, previous control errors should be proportionally related to previous set points. This proportional relationship only holds true, however, if there are no unmeasured disturbances. If unmeasured disturbances occurred in the past, then it is important to consider them in the control equation. The MPC controller method presented herein addresses this issue and uses error information to drive the controller output directly, thereby improving feedback control performance. This method of improving feedback control of an MPC controller can be implemented to avoid adverse effects on set point change performance and overall performance in the absence of model mismatch.

Figure 4:
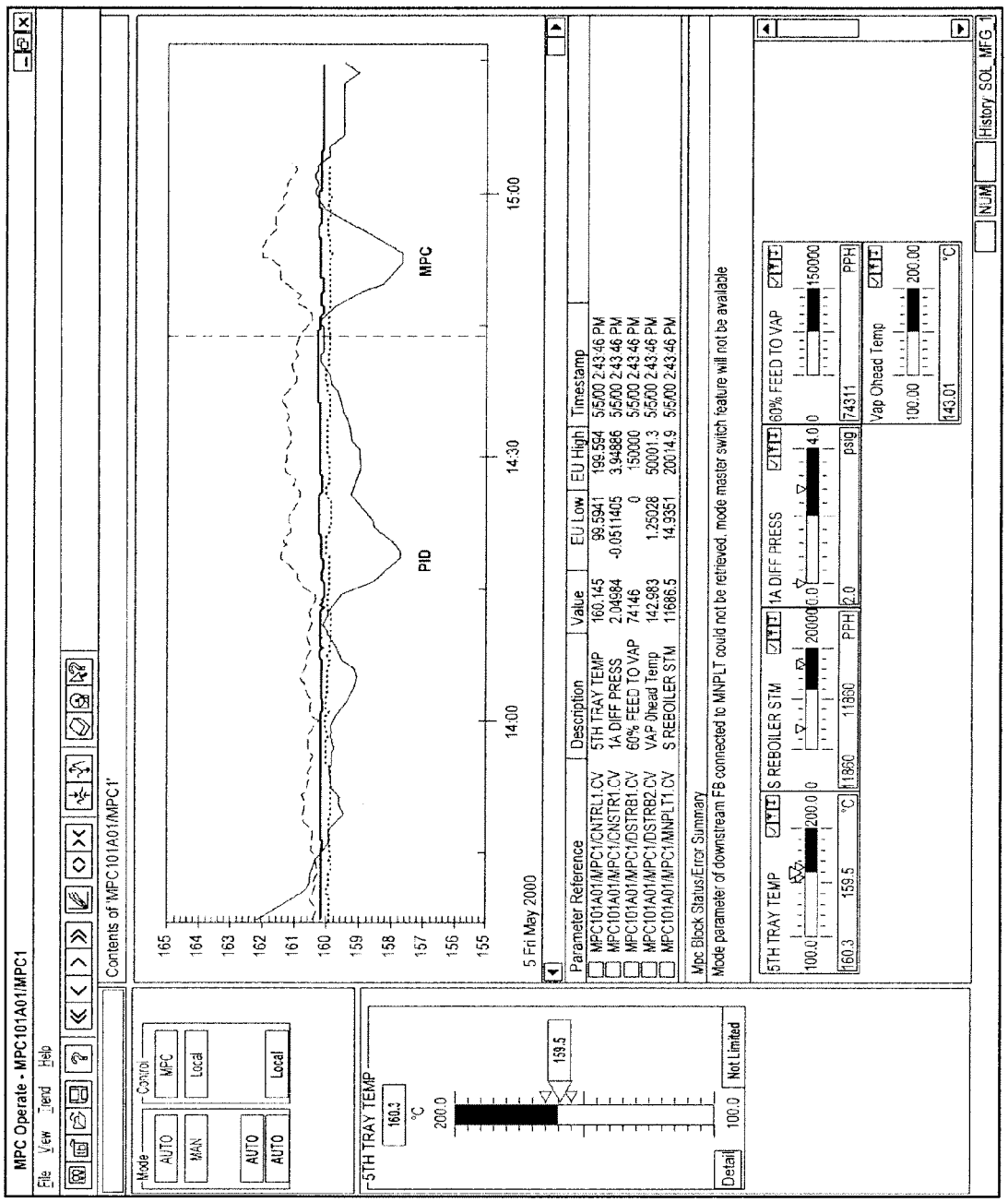
FIG. 4 is a screenshot of operator interface from a chemical plant comparing PID and MPC disturbance rejection performance.

The inventor's hands-on experience with a large chemical plant site of Solutia (formerly Monsanto) in Alabama in 2000 provided special motivation for the findings discussed herein. Generally, there are numerous benefits (and challenges) of using embedded MPC, which allows model predictive control in an embedded controller hardware unit in the field. Embedded MPC has many advantages over third party solutions, such as redundancy, fast sample periods, easy and seamless configuration, and commissioning without disruption to the running process. Two very challenging processes where chosen as candidates for conversion from PID to MPC strategies. One of the challenging processes was a decoupling application which was successfully implemented by the plant engineers and led to outstanding performance improvements. The other challenging process was a single input process that depended heavily on feedback control because the process parameters were drifting significantly due to many unmeasurable disturbances (from both upstream and downstream units) impacting the feedback control. During a set of experiments, five control experts tried at first to improve the original PID feedback control performance by using MPC and later to at least match MPC to what was observed with PID for over five days, without success. FIG. 4 provides a plot illustrating the best MPC disturbance rejection performance that could be achieved compared to the disturbance rejection of PID control which was used to control this particular process for more than 50 years.

From FIG. 4, it can be seen that, when exposed to approximately the same unmeasured disturbance, MPC control shows a larger control error but brings the controlled variable back to the set point slightly earlier overall, depending on the specific production criteria. This performance may or may not be considered a small improvement. The question that remains, however, is why are modern control algorithms, such as MPC, when applied to practical plant applications, not able to perform as well as PID, a technology developed more than 100 years ago? One of the most prevalent and successful applications of model predictive control is, of course, multivariable control of distillation columns, which is, as with most multivariable applications, a process that is very difficult to control with PID controllers. However, MPC is often advertised and used for lag-dominant single loop applications, in which it usually performs worse than PID. In any event, the MPC controller described herein includes a modification to the MPC feedback correction algorithm that can be used to close the feedback performance gap between MPC and PID.

Drawbacks of Model-Based Control

For set point racking applications, the ability of the predictive controller to store and update an approximation of the process state provides the control performance advantage of model-based controllers over model free controllers. However, this same mechanism impairs the ability of the predictive controller to move the controller output fast enough to react to an unmeasured disturbance scenario because the approximated state has to be corrected before the actual control error is calculated, and therefore before any corrective control action can be taken. In other words, an unexpected output change has to cause a prediction update before it can cause a control move. If it could be assumed that the model is perfect, the state update procedure is straightforward because the entire error term can immediately be attributed to unmeasured disturbances, i.e., there can be a full state update at each sample period. However modern commercial MPC controllers have filter factors that even-out such changes over multiple sample periods to prevent instability, because neither perfect nor linear models are expected in industrial applications. While researchers have suggested methods that distinguish between unmeasured disturbance and model error, such methods are very difficult and expensive to carry out during the runtime of a controller. Furthermore, even if it could be known exactly what fraction of prediction error resulted from an unmeasured disturbance versus model error, the corrective action of the controller would not be optimally fast until the process model is re-identified.

The commissioning of model-based controllers natively involves matching the controller model parameters to the process model parameters. Model-based tuning methods for PID controllers are intended to simplify PID tuning by mimicking model-based controller behavior. Because the PID controller equation cannot account for deadtime, a Smith predictor setup allows matching the process deadtime to the Smith predictor deadtime. Methods like pole cancellation and lambda tuning match the integral time of the controller to the dominant time constant in the process. Lambda tuning adds an additional tuning parameter ($\lambda$), with which the engineer can pick a desired closed loop settling time.

As discussed previously, model-based controllers excel in deadtime dominant single-loop processes because the deadtime model parameter can be matched to the equivalent deadtime controller parameter. Examples of such processes are flow loops, static mixers, and paper machines, while the most common examples of lag-dominant processes include temperature and pressure loops, and the chemical process at Solutia mentioned above. On the other hand, lag-dominant processes are better controlled by a tuned controller than by a matched model-based controller or a PID controller with model-based tuning. It has been suggested that most of the reason for this behavior is related to the integral action of a PID controller.

However, a model-based controller does not have any components that allow direct tuning of the integral action that can be applied in the feedback calculation. While a linear quadratic regulator (LQR) can be shown to have integral action when it is augmented with a Kalman filter for state update, the integral action is not independently tunable. The object instead is to minimize the objective function (J), expressed as:

$$J = \int_0^{t_f} [xQx^T + uRu^T] \qquad (9)$$

$$x(t) = Ax(t) + Bu(t); z(t) = -y(t) \qquad (10)$$

$$u = -K'x'(t) = -\left[K_x x(t) - K_z \int y(t)dt\right] \qquad (11)$$

This combination is also known as the linear quadratic Gaussian (LQG) controller, a fundamental form of linear model-based control. As with PID controllers, integral action in model predictive controllers is necessary to control to the set point without leaving an offset.

From the above tuning discussion, it is apparent that dead-time-dominant processes require a different set of controller features than lag-dominant processes. If too much delay exists, the best possible performance is $$\frac{IE}{\Delta q K_q \tau_d} = 1,$$

and a model-based controller with matched tuning is required. If too much lag is present, the performance can be better than $$\frac{IE}{\Delta q K_q \tau_d} = 1$$

as long as the process is not controlled by a model-based controller, but is instead controlled by a PID with appropriate unmatched integral tuning. The inventor has, however, developed an MPC controller form that combines the advantages of both scenarios, thereby providing for better MPC control.

Tuning of Model-Based Control

The previous discussion touched on the advantages and ideal operating ranges of model-based and PID controllers with respect to fractional deadtime, while the discussion below compares the robustness of the two controller types. As mentioned above, model-based controllers, such as MPC controllers, have better feedback performance in the deadtime dominant region. In the lag-dominant region, which is at least as common as the deadtime dominant region, the PID controller generally provides better feedback control performance. This observation has triggered many improvements to the original MPC algorithm, such as the addition of Kalman filtering, which have been widely accepted and implemented in industrial MPC products. Commercial model predictive controllers are now capable of better performance than traditional internal model control (IMC). The performance and tuning differences between model-based and PID controllers with respect to fractional deadtime will be discussed below.

Figure 5A:
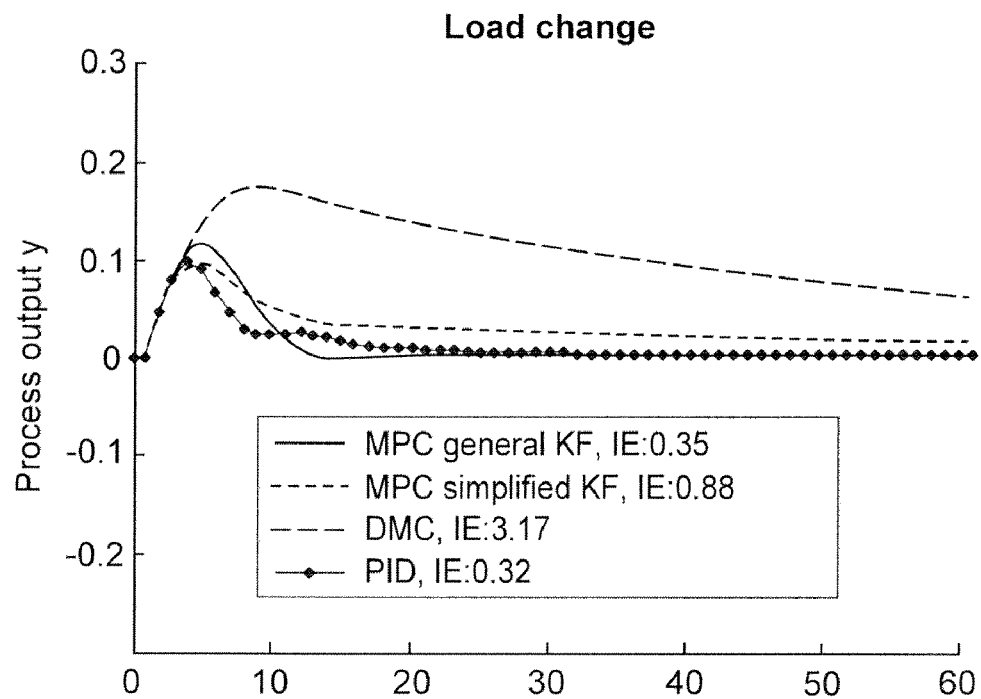
FIGS. 5A and 5B depict comparisons of three different MPC controllers for a first order plus deadtime process and a PID controller in response to load disturbance.
Figure 5B:
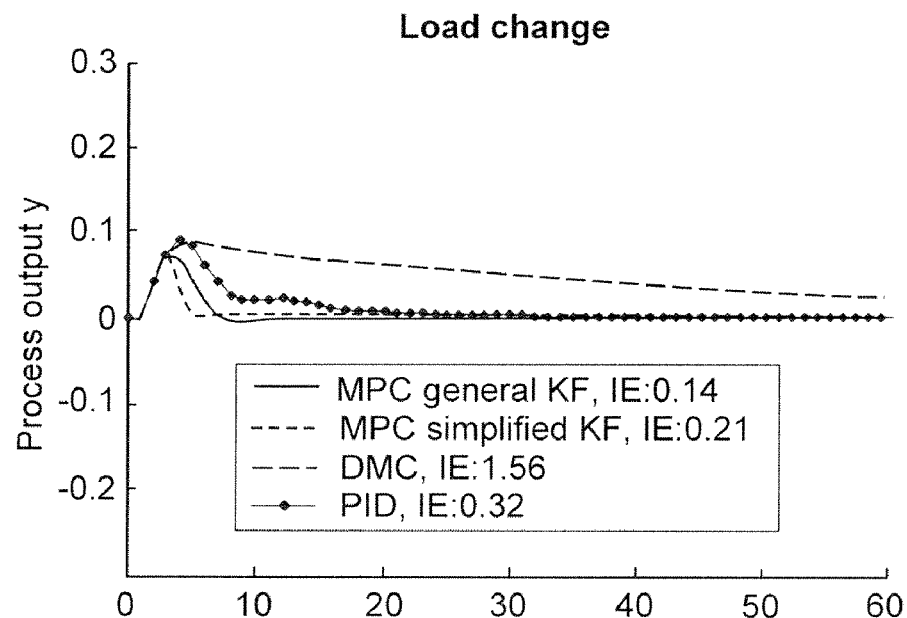

FIGS. 5A and 5B depict a comparison of three different MPC controllers for a first order plus deadtime (FOPDT) process with the following transfer function:

$$G(s) = \frac{1}{50s+1} e^{-s}.$$

Here, the model parameters for the various controllers associated with disturbance rejection are set to be: process gain (K)=1, first order time constant ($T_1$)=50, second order time constant ($T_2$)=0 and deadtime ($T_D$)=1. For a PID controller, Skogestad tuning was used with the controller gain (Kc)=25, integral time constant (Ti)=8 and derivative time constant (Td)=0. For the MPC controller tuning, the prediction horizon (P)=10, the control horizon (M)=3 and the penalty variable (Q)=1. However, for FIG. 5A, the penalty variable (R)=0.1 and for FIG. 5B, R=0.01. The PID controller with Skogestad tuning is included for comparison. As illustrated in FIG. 5A, dynamic matrix control (DMC), which originally used a prediction biasing calculation to account for prediction error, achieves an integrated absolute error of 3.17, which for an unmeasured disturbance of $\Delta q=1$ and the above transfer functions gives $$\frac{IE}{\Delta q K_q \tau_d} = 3.17 > 1.$$

This type of controller therefore presents the worst feedback control performance of the compared controllers. If different implementations of Kalman filtering are used, the normalized integral error $$\frac{IE}{\Delta q K_q \tau_d}$$

becomes 0.68 and 0.35, respectively, representing a significant improvement over IMC with $$\frac{IE}{\Delta q K_q \tau_d} = 1.$$

In this scenario, however, MPC still falls slightly short of PID, which achieves $$\frac{IE}{\Delta q K_q \tau_d} = 0.32.$$

Such good performance numbers are only achieved because the balance between error and move term from Equation (3) is forced towards faster control moves in addition to the application of Kalman filtering. In other words, penalty tuning for controller speed becomes effective if the feedback path employs a Kalman filter. While penalty tuning has an effect on the DMC controller, it cannot bring the normalized integral error below 1. If the particular penalty tuning balance of Q=1 and R=0.1 from FIG. 5A is further adjusted for performance to Q=1, R=0.01 (FIG. 5B), then the normalized integral error goes to 0.21 and 0.14, respectively, and is significantly improved.

Figure 6A:
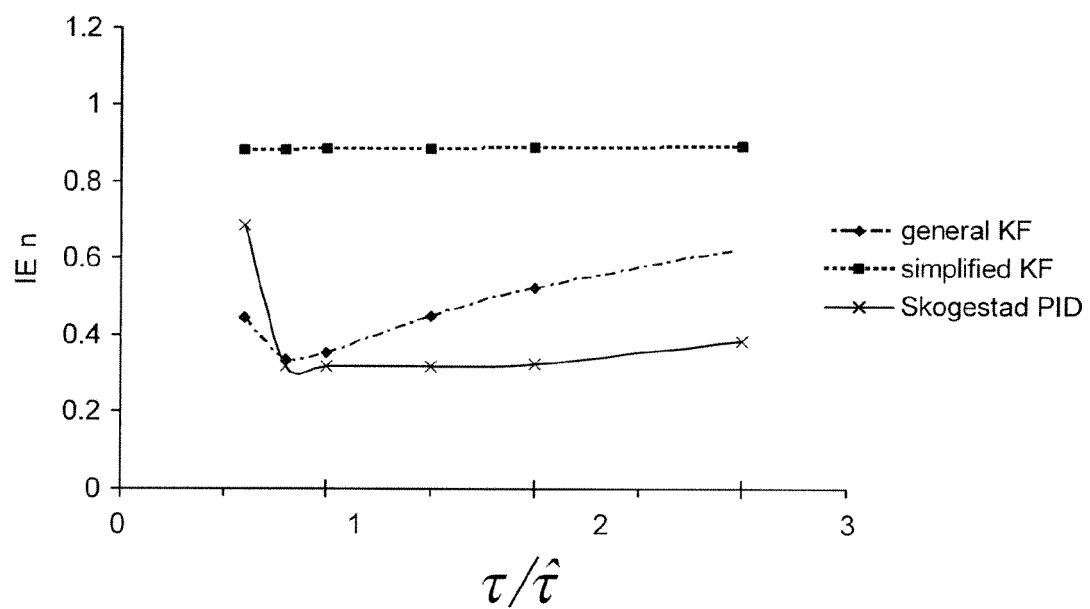
FIG. 6A and 6B depict comparisons of different MPC controllers and a PID controller illustrating feedback control performance depending on model mismatch and penalty tuning.
Figure 6B:
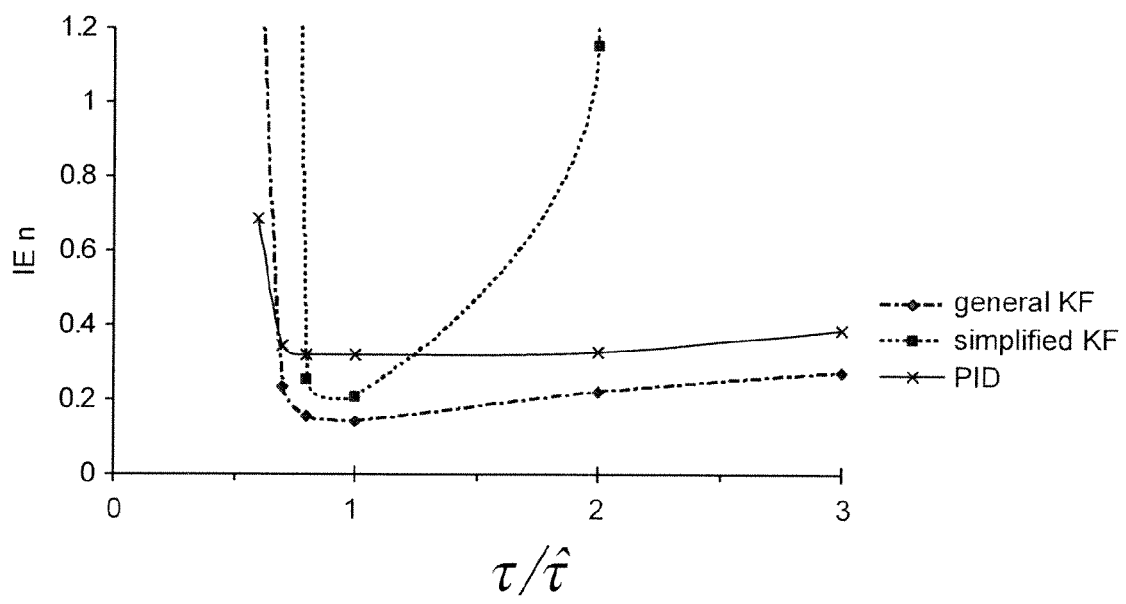

The comparison of FIGS. 5A and 5B illustrates that modern model predictive controllers can be tuned to perform better than classical internal model controllers based on PID control, i.e., better than $$\frac{IE}{\Delta q K_q \tau_d} = 1$$

as long as Kalman filtering is used. The original purpose of adding tuning parameters to MPC, however, was to increase robustness in case of model mismatch by making the controller more sluggish. Using the same tuning to increase performance is clearly a negative use of the original idea and inevitably yields a loss of robustness, as seen in FIGS. 6A and 6B which illustrate feedback control performance depending on model mismatch and penalty tuning. In FIGS. 6A and 6B, the process model was set such that K=1, $T_1$=50, $T_2$=0 $T_D$=1, the PID controller with tuned with Skogestad tuning using Kc=25, Ti=8, Td=0 and the MPC controllers were tuned such that P=10, M=3, Q=1 and wherein R=0.1 in FIGS. 6A and R=0.01 in FIG. 6B. In this example, the model mismatch in the first order time constant is only 2 ($\tau/\tilde{\tau}=2$) and model predictive control becomes oscillatory. FIGS. 6A and 6B depict the tuning tradeoff between performance and robustness in model predictive control with a Kalman filter. For the simplified Kalman filter implementation as described above, the integrated absolute error plot with the more balanced error and move terms of Q/R=10 (FIG. 6A) is notably flatter than that of the higher performance tuning with Q/R=100 (FIG. 6B). This performance indicates significantly more robustness to model mismatch in first order time constant. However, FIG. 6B shows considerably better control performance around $\tau/\tilde{\tau}=1$, i.e., if the model is known perfectly. What can be observed for general Kalman filter MPC with the same tuning if $\tau>\tilde{\tau}$ is the counterintuitive opposite of the conclusion for the simplified Kalman filter MPC. As the move penalties are reduced, the performance becomes better and the curve becomes flatter. This, however, does not hold true for $\tau<\tilde{\tau}$.

Bearing this in mind, it appears that MPC penalty tuning is arbitrary until the impact of model mismatch is considered. Because the set point change performance is not worsened as the disturbance rejection performance is improved, the terms could be unbalanced further and further in the direction of the best performance.

TUNING FOR INDUSTRIAL PROCESS CHARACTERISTICS

First order plus deadtime processes are not very representative of processes controlled by industrial control systems. Common processes in industrial plants include multiple physical, chemical or biological characteristics that change in series before the effect on a controlled variable is measured by a sensor. Industrial processes are often equivalent to a series of dynamic transfer functions. A common control loop includes, aside from the process, a number of valves, valve positioners and hardware sensors that may add many additional transfer functions to the loop, thereby potentially increasing the process model order significantly. Control device and transmitter manufacturers seek to reduce the impact that time constants of their products have on loop performance by using fast mechanical linkages and sensor materials. In spite of these techniques, requiring too much speed and too high of sampling rates conflicts with noise reduction and aliasing objectives, and may also be very expensive and/or energy consuming. Even though industrial processes often have many more time constants, the resulting overall curve shape can be approximated by a second order process model with little modeling error because the lags usually interact.

Figure 7:
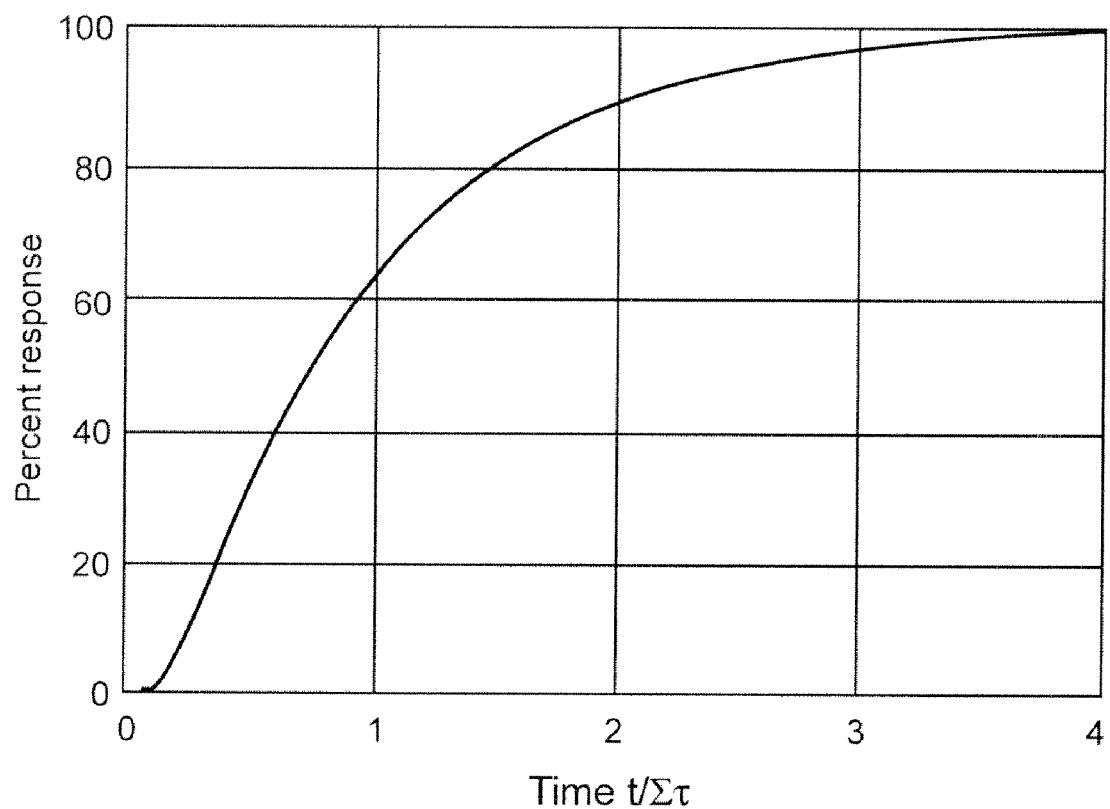
FIG. 7 illustrates an example step response of a distillation tower with 20 trays that effectively creates 20 independent lag time constants in series.

FIG. 7 illustrates a step response of a distillation tower with 20 trays that effectively creates 20 independent lag time constants in series. The overall curve shape very closely resembles a second order curve, and the resulting time constant may be calculated as:

$$\sum \tau = \tau_i \sum_1^n i = \tau_i \frac{n^2+n}{2} \quad (12)$$

Figure 8A:
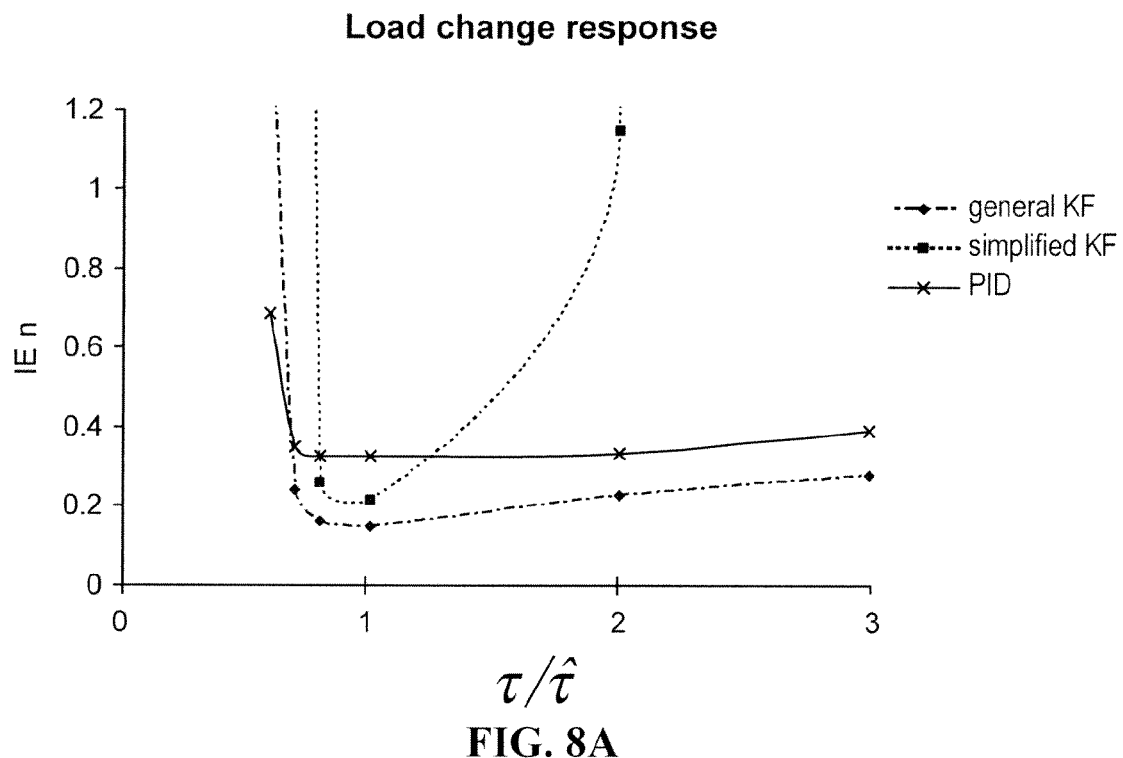
FIGS. 8A and 8B depict feedback control performance depending on model mismatch and penalty tuning for first and second order processes with deadtime.
Figure 8B:
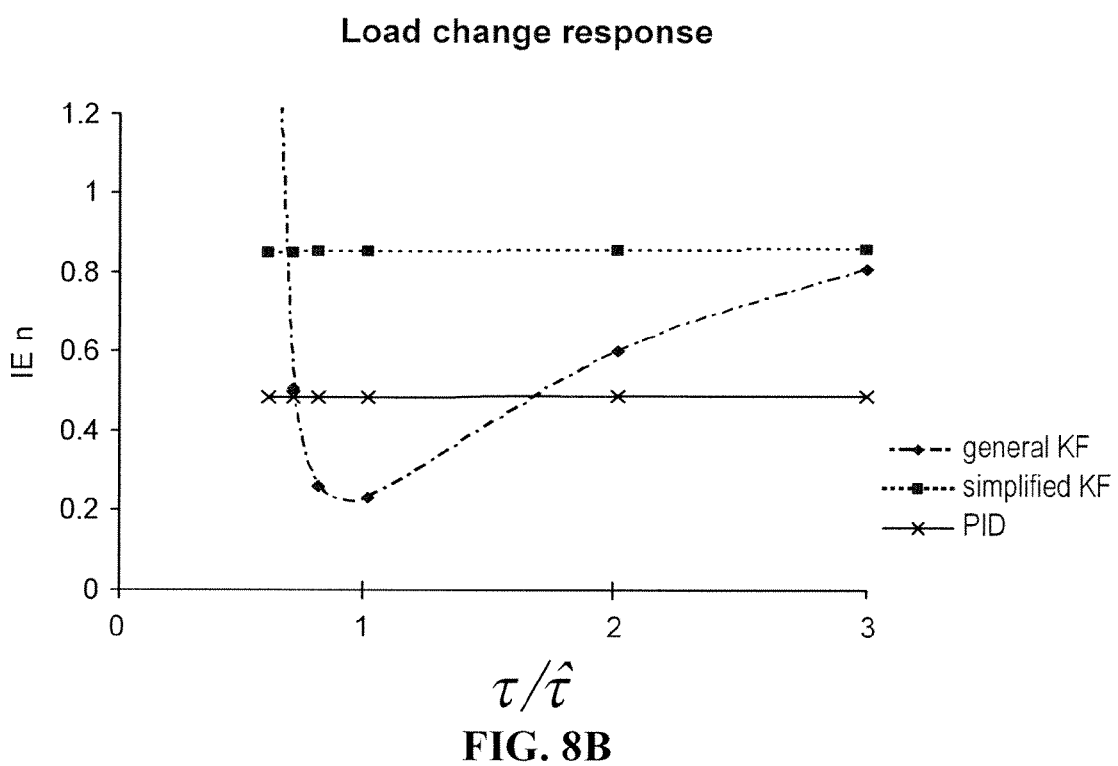

In industrial applications, first and second order approximations of a given controlled process are most common. Considering a certain amount of model mismatch, which can never be eliminated, second and third order process models are very comparable with respect to model error. Thus, industrial users usually model no more than two time constants, plus deadtime. The discussion provided below indicates which of the previously discussed dynamic behaviors are different when controlling a second order plus deadtime (SOPDT) process. However, no significant differences could be found when comparing second to third order plus deadtime processes. FIGS. 8A and 8B depict feedback control performance depending on model mismatch and penalty tuning to illustrate how the tuning discussed above performs on both a FOPDT and a SOPDT process. In FIGS. 8A and 8B, the process model was set so that K=1, $T_1$=50, $T_2$=0, $T_D$=1. The PID controller was tuned using Skogestad tuning with Kc=25, Ti=8, Td=0 and the MPC controllers were tuned such that P=10, M=3, Q=1 and R=0.1 in FIG. 8A and R=0.01 in FIG. 8B.

Similar to the FOPDT process, the SOPDT process also achieves the best possible control performance at $\tau=\tilde{\tau}$ (with no model mismatch). However the IAE values are different because the two different controllers control two different processes:

$$G_{FOPDT}(s) = \frac{1}{50s+1}e^{-s}$$

and $$G_{SOPDT}(s) = \frac{1}{(30s+1)(20s+1)}e^{-s}$$

Figure 9A:
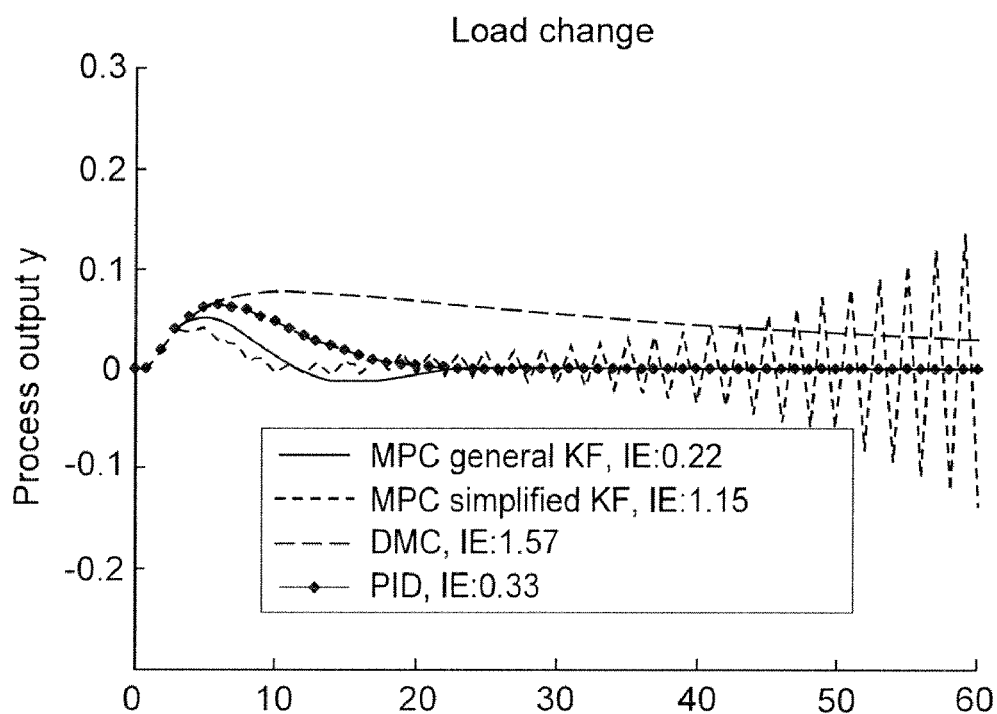
FIGS. 9A and 9B illustrate oscillation due to model mismatch on first and second order processes.
Figure 9B:
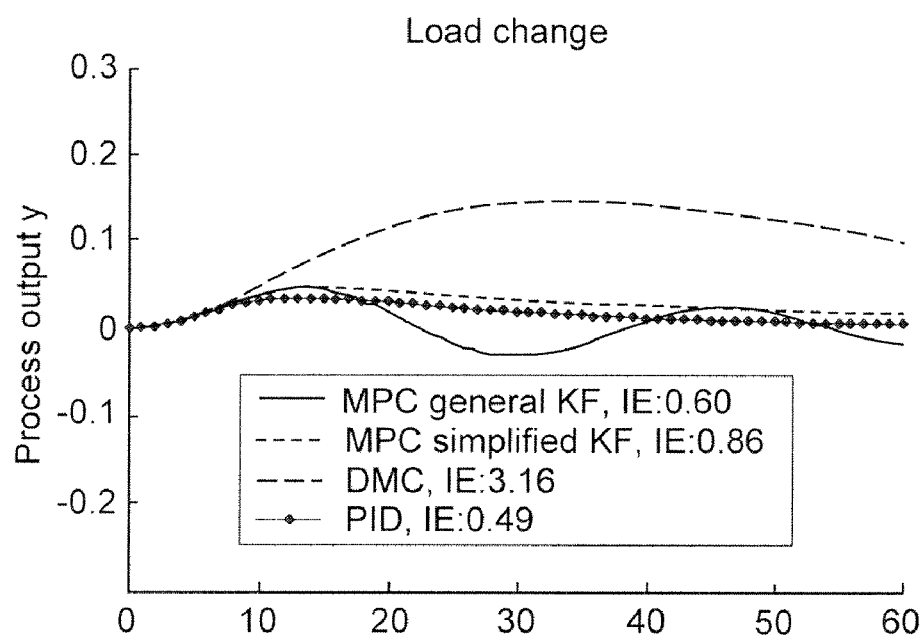

The optimal prediction and control horizons are also different between the two controllers. While P=10 and M=3 is ideal for the FOPDT process, the SOPDT process is best controlled with P=30 and M=9. This result is not surprising, as the additional order adds another change in slope even though the total settling time of a FOPDT with $\tau=50$ is very similar to that of a SOPDT with $\tau_1=30$ and $\tau_2=20$. The two Kalman filter formulations behave very different if they are connected to a first or second order process. While MPC with the simplified Kalman filter improves drastically throughout the entire range and the slope flattens significantly, MPC with general Kalman filter performs considerably worse on the second order process. However, the control performance of MPC with general Kalman filter seems to be much less sensitive to model error. Classical DMC is negatively affected by the introduction of the second order time constant because its prediction error correction algorithm, which operates by biasing the prediction vector, does not handle model mismatch very well. The presence of a second order filter time constant works to the advantage of the model predictive controller with simplified Kalman filtering. FIGS. 9A and 9B illustrate the oscillation due to model mismatch ($\tau/\tilde{\tau}=2$) on first order (FIG. 9A) and second order (FIG. 9B) processes with the process models given above, and with PID Skogestad tuning with Kc=25, Ti=8, Td=0 and with MPC tuning with Q=1 and R=0.01 and, in the FOPDT process (FIG. 9A) P=10 and M=3 and in the SOPDT process (FIG. 9B) P=30 and M=9. The oscillations that occurred with fast tuning in the presence of model mismatch (FIG. 9A) are completely dampened (as shown in FIG. 9B) which plots the same penalty tuning and model mismatch for the MPC controlling the second order process.

Of course, simplified Kalman filtering is a state update method that simplifies tuning by using a tunable filter time constant in the feedback path. This time constant is set based on knowledge about signal-to-noise ratio as discussed above.

PID control is also much less sensitive to model mismatch in a second order process scenario than in a first order process scenario. This observation is fairly logical because a PID has two terms that can be used to compensate for two different process time constants. A PI controller is more suitable for controlling a first order process than MPC with simplified Kalman filter. Given the above information, it can be seen that MPC with simplified Kalman filter shares more similarities with PID than MPC with general Kalman filter, in terms of tuning by means of filter time constant. This type of empirical tuning has a positive impact on performance if model mismatch is present.

However, the main conclusion that can be drawn from FIGS. 8A and 8B is that, in all types of the considered processes, including higher order processes, the PID controller is outperformed by one of the MPC controllers, general or simplified, around $\tau$ being approximately equal to $\bar{\tau}$, i.e., when there is no or very small model mismatch. However due to the tuning that is required in a model predictive controller to achieve such control performance, the PID is much more stable in the presence of model mismatch. As a result, PID control outperforms MPC control in process scenarios that are much more likely to occur in actual practice. The simple formulation of a PID controller allows the integral action to impact the outputs directly if an error is present for some amount of time. As discussed above, while this is advantageous for lead dominant processes, it is disadvantageous for deadtime dominant processes. However, to overcome or offset this problem, the inventor has developed a model-based controller with tunable integral action as found in PID, to provide this advantage of PID controllers in an MPC controller.

AUGMENTING TUNABLE FEEDBACK TO MPC

As discussed above, fractional deadtime plays a large role in determining whether PID-like integral action in MPC is appropriate or not, and to what magnitude it should be tuned. The optimal tuning of integral action must, therefore, depend on fractional deadtime directly. In particular, while strong integral action greatly improves the feedback control performance on a lag-dominant process, it must be reduced or shut off completely in a deadtime-dominant process. In this manner, tuning of integral action can be used to fit the MPC controller to the specific fractional deadtime properties of a process. The integral tuning may even be adapted online automatically if the process transitions between different regions of fractional deadtime. Such adaptation is practical because the tuning depends only slightly on model mismatch. Instead, tuning has much greater dependence on fractional deadtime, which is much easier to measure than model mismatch.

Figure 10:
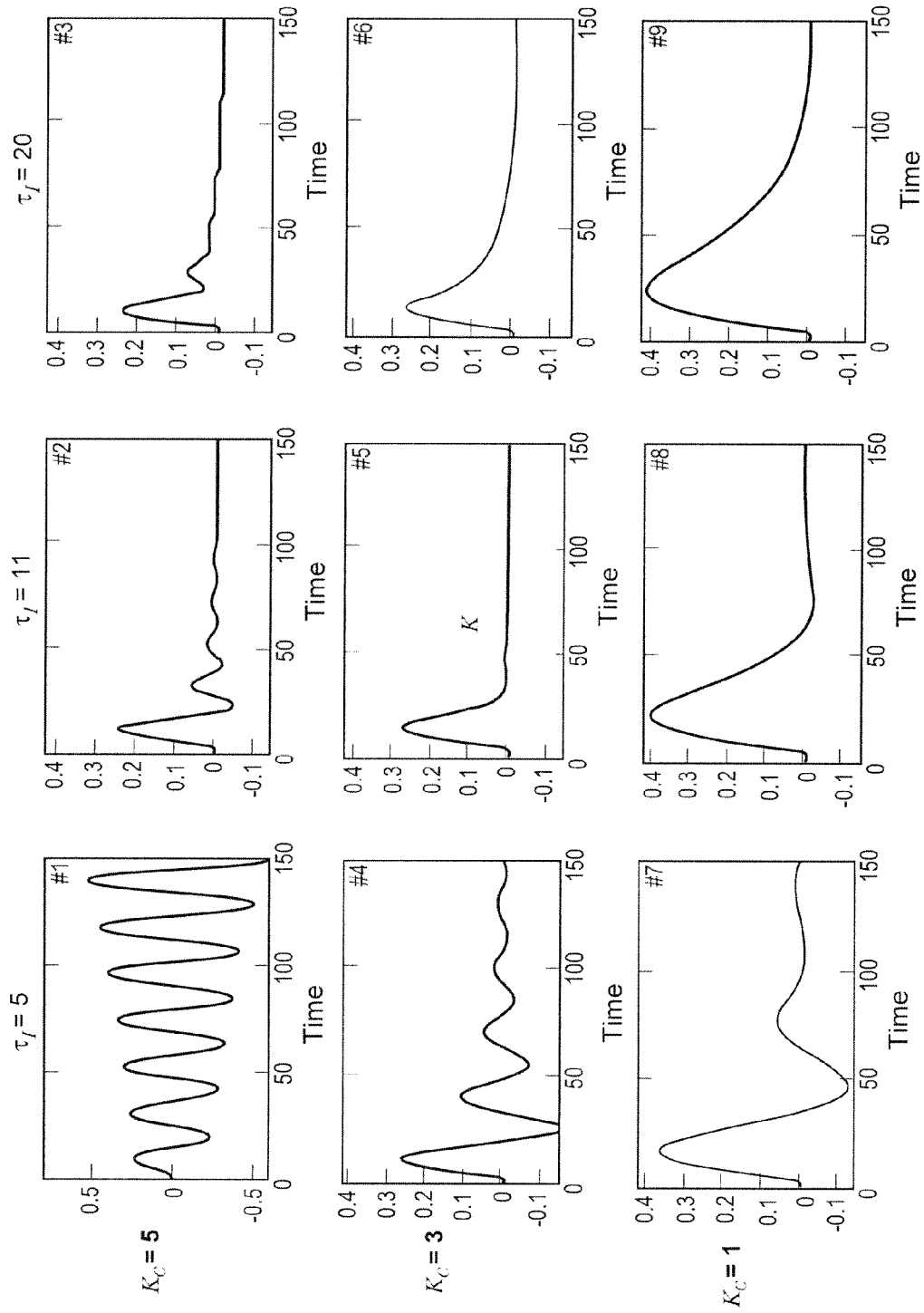
FIG. 10 depicts unit step disturbance responses of PI controllers with different tuning settings to illustrate how the proportional and integral action of a PI controller impacts the load performance of the controller for different process characteristics when an unmeasured unit step disturbance is introduced.

Because PI control and PID control are still the most popular feedback controllers in the process control industry, the functionality and tuning of the I-term in a PID controller is well understood. In some cases, reset and other tuning parameters are calculated based on known tuning rules. As mentioned before, some tuning rules require a process model, while others use closed loop characteristics, such as critical gain and critical period. Even if such parameters are unknown, plant operators and control engineers often intuitively know how to tune a controller incrementally from the current settings based on their experience. FIG. 10 illustrates how the proportional and integral action of a PI controller impacts the load performance of the controller for different process characteristics when an unmeasured unit step disturbance is introduced. Charts such as those of FIG. 10 make it easy to determine whether the ideal setting for a tuning parameter is above or below the current value. Using the knowledge represented by these charts, it is possible to find the ideal tuning by trial-and-error without the need to identify a process model.

As can be seen from the charts of FIG. 10, adding integral action (reducing $t_i$) speeds up the load disturbance rejection but usually impacts the set point change behavior negatively, as previously discussed. Two degrees of freedom controller formulations compensate for this problem, which applies to PID but not to model-based control. In fact, such tuning methods and control equation modifications are clearly not model-based, but empirical. Whenever researchers or practitioners add tuning parameters to the original three (gain, reset, rate), it is usually with the intent to better fit the PID algorithm to a particular usage scenario or group of usage scenarios. Such parameters simplify tuning for the specific application but often make it harder to tune based on model knowledge. Sometimes they allow substituting of model knowledge with knowledge about actual control performance versus desired control performance.

Figure 11:
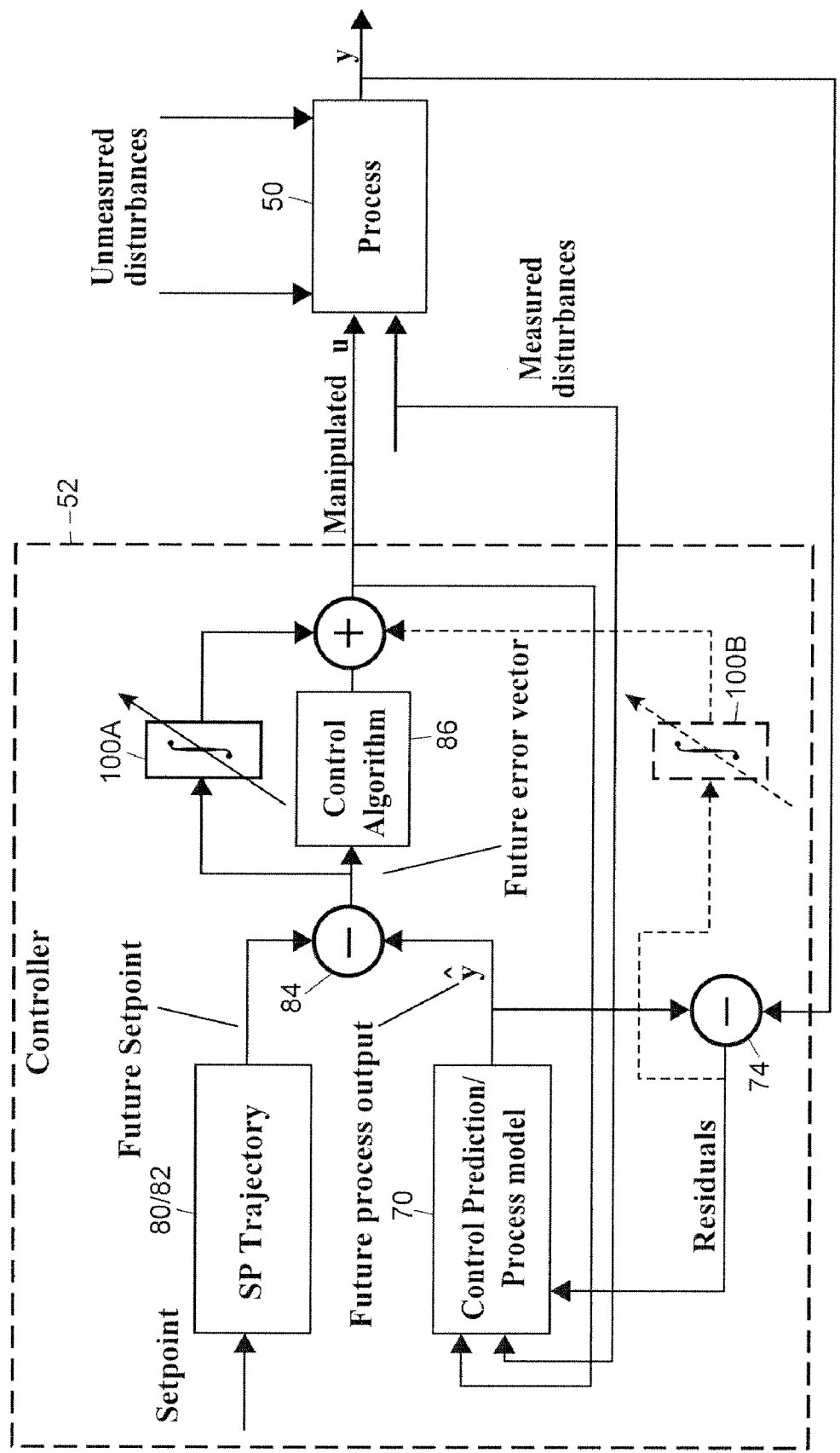
FIG. 11 illustrates a schematic diagram of a model predictive controller configured to have tunable integral action in the feedback path.

However, as mentioned above, a model-based controller does not have any components that allow direct tuning of the integral action to be applied in the feedback calculation. The fact that model-based controllers can account for unmeasured disturbances without any offset means that they exhibit integral like action, it is just that this integral action is not tunable. FIG. 11 however illustrates a couple of manners in which tunable integral action can be augmented in the feedback path of a model predictive controller to provide a tunable integral component to an MPC controller, to thereby increase the performance of the MPC controller in the presence of model mismatch. In particular, the MPC controller of FIG. 11 is similar to that of FIG. 2 with like elements having the same reference numbers. However, a tunable integration component 100A or 100B is provided to integrate an error signal within the MPC controller 52 and add this integration component to the control signals output by the MPC control algorithm 86.

In particular, the augmented integrator or integration block 100A can be used to integrate the future error vector (solid line implementation of the block 100A) or to integrate the residuals (dotted line implementation of the block 100B). The former (block 100A) generally achieves the best results because the residuals are only one of the contributing factors to the error vector, and thus have less impact on the control action calculated by the control algorithm 86. Factors that can reduce the impact of a direct integral action which are augmented to residuals include filter methods for residuals and the set point. In both scenarios, the characteristic PID integral behavior is achieved by adding to the controller output directly, as is performed in a PID controller. This technique allows the controller 52 to react to an unmeasured disturbance more rapidly and within the same sample period as the period in which the disturbance occurred, which is the huge benefit of a model predictive controller (which is able to pre-calculate multiple future moves based on the process model and future prediction of process outputs).

By the way of further explanation, when MPC as defined in Equation (3) is implemented in a time discrete sampling control system, it results in a recursive algorithm that uses filter-time constants to correct for unmeasured disturbances and model mismatch. Here, the predicted future-process outputs and target set point trajectory are used to calculate the future-control moves, and the predicted future moves are in turn used to update the state variables, i.e., the future output prediction. A standard MPC as described in Equation (3) with default tuning will correct an unmeasured disturbance as fast as possible in an optimal sense. However, if there is model mismatch, this recursive calculation will be unbalanced for a longer time than without model mismatch, which is what the integral term of a PID controller is designed to pick up and act upon. It is therefore possible to distinguish which part of the future error vector, which is shown in FIG. 11, is a result of set point change versus unmeasured disturbance. Depending on the tuning of the integral action, the actual effect of integral tuning will only be noticeable if model mismatch is present. In the absence of model mismatch, less integral action may be required for the best control performance.

Figure 12A:
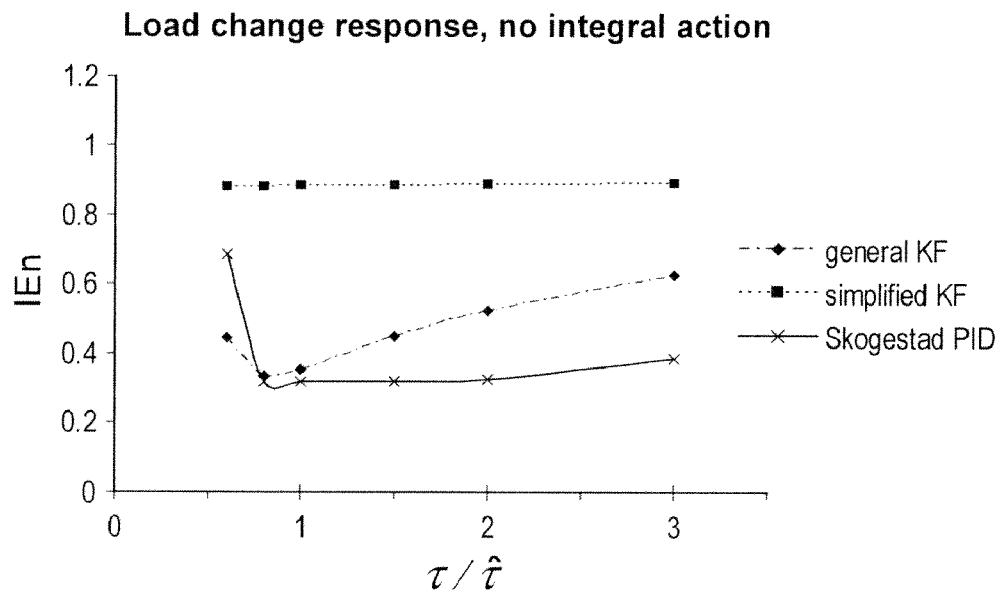
FIGS. 12A and 12B are charts depicting the comparison of robustness before and after adding tunable integral action to the future error vector in an MPC controller.
Figure 12B:
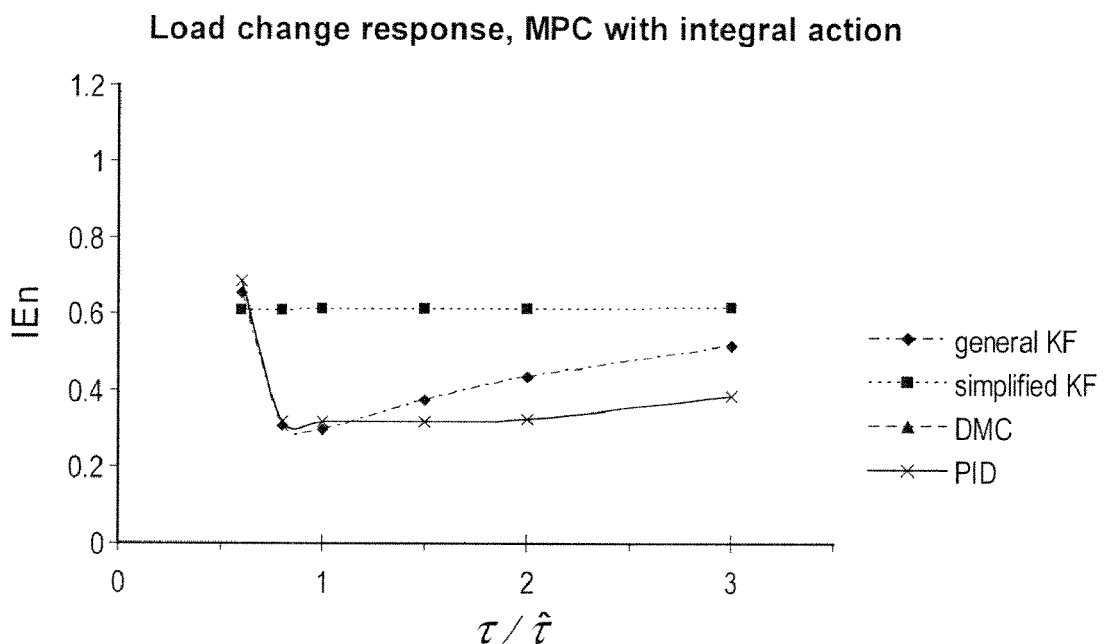

FIGS. 12A and 12B depict controller operation in response to load disturbances without the tunable integral action described above (FIG. 12A) and with tunable integral action (FIG. 12B) for various MPC controllers. As can be seen in FIGS. 12A and 12B, for the MPC controller with a general Kalman filter, the integral action adds very little benefit. However, at $\tau/\tilde{\tau}=1$, the performance-increasing effect of integral action becomes more and more obvious as the model mismatch increases. The resulting control performance charted over time is depicted in FIGS. 13A and 13B, in which FIG. 13A does not include tunable integral action and FIG. 13B includes tunable integral action for the three types of model predictive controllers.

Figure 13A:
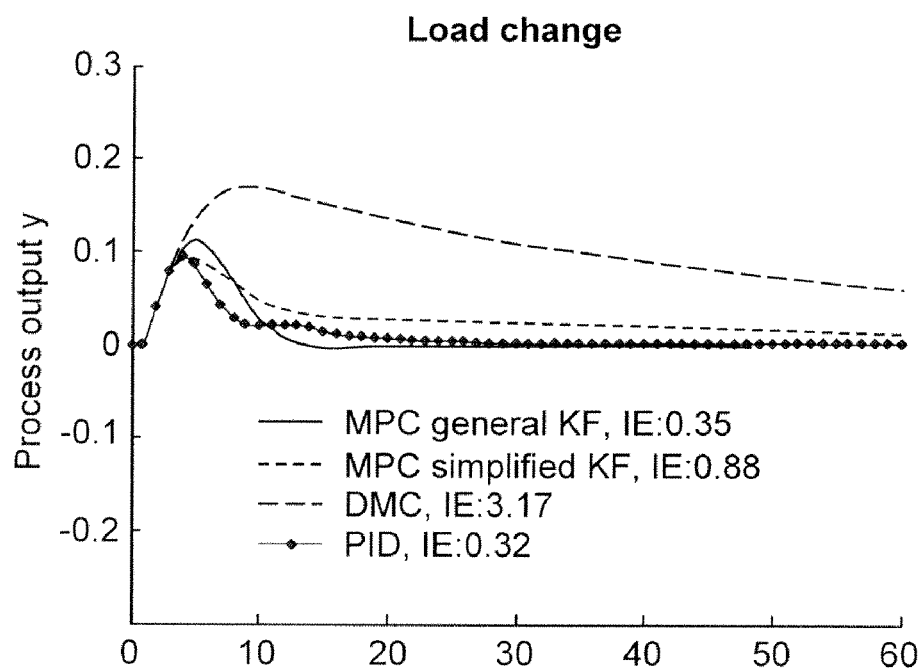
FIGS. 13A and 13B are charts depicting a comparison of load rejection performance before and after adding tunable integral action to the future error vector calculation of a number of different types of MPC controllers.
Figure 13B:
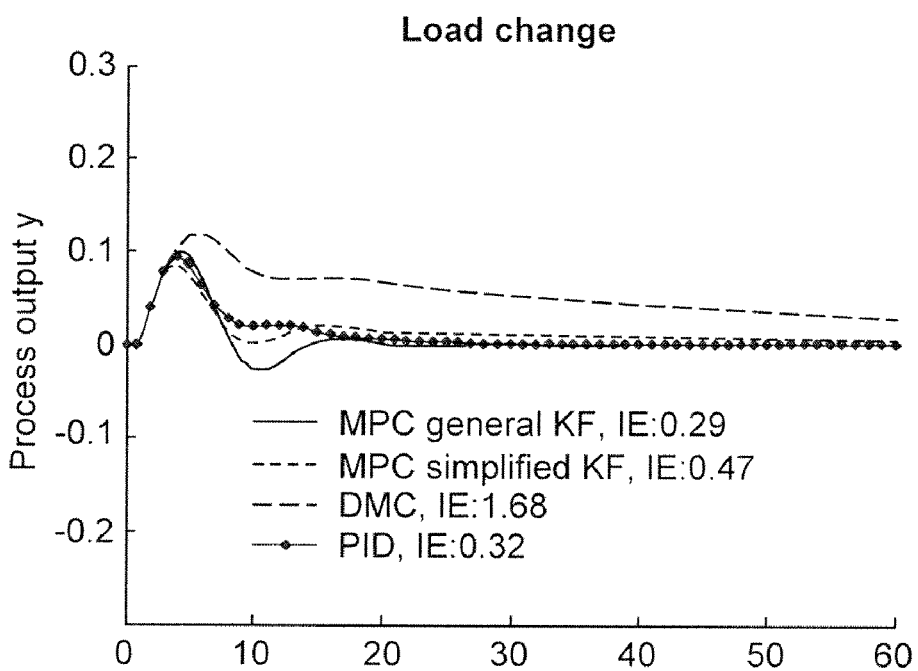
Figure 14A:
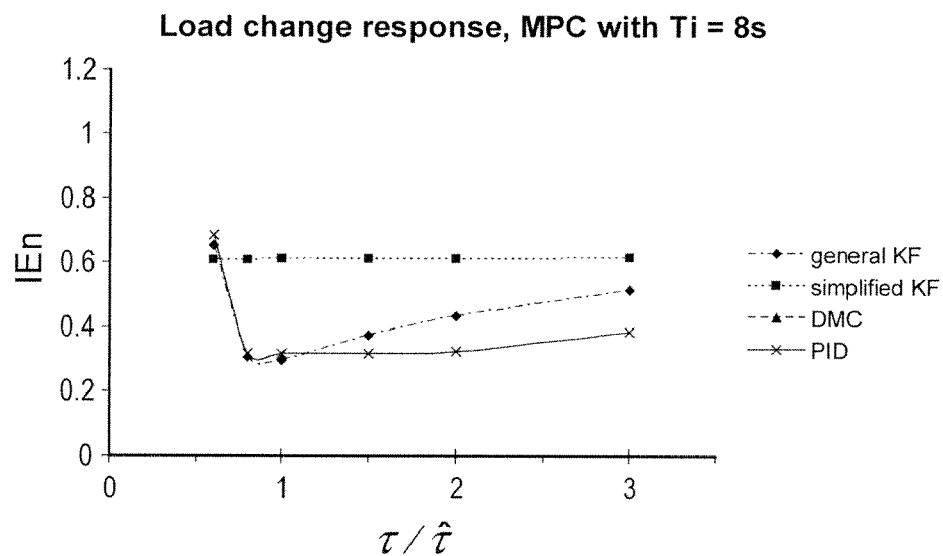
FIGS. 14A and 14B are charts depicting a comparison of robustness and performance with manual tuning of integral action on the future error vector of MPC controllers in a first order process.
Figure 14B:
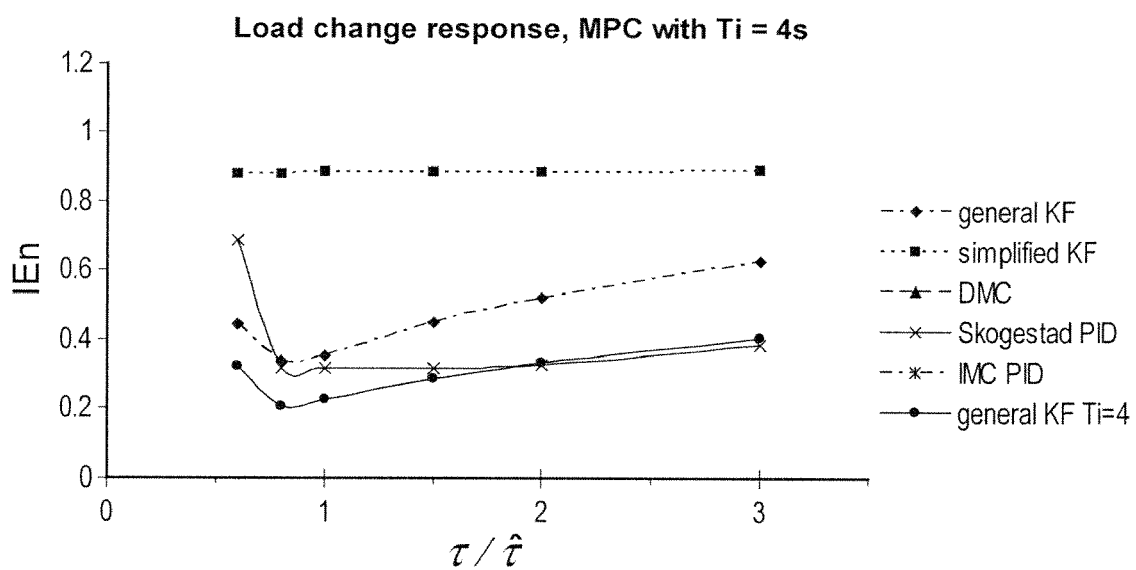

In FIGS. 13A and 13B, the PID response is plotted for reference and, as will be seen, all three MPC controllers show a significant performance improvement. The greatest absolute improvement can be found on the DMC controller. In fact, the IAE of the DMC controller is reduced by 1.49 which is a 47% improvement from the standard DMC formulation. MPC controllers with general and with simplified Kalman filter improve by 29.1% and 46.6%, respectively. The most remarkable result, however, is that as the performance improves, the robustness does not suffer at all. FIGS. 12A and 12B provide a comparison of performance in relation to model mismatch. The MPC plots of FIG. 12B not only dropped, as compared to those of FIG. 12A, but also became flatter than, or as flat as, those without augmented integral action. Here, tuning of the integral action calculated by Skogestad rules, the same way a PID controller would be tuned, resulted in an integral time constant of $T_i=8s$. The results of this tuning in response to model mismatch are illustrated in FIG. 14A. Manual tuning of the augmented integrator can further improve the feedback control performance. Empirical tuning resulted in a stronger integral action with $T_i=4s$, the results of which are shown in FIG. 14B. The integral action can actually be increased even further until, at Ti=2, the curve slope becomes steeper again, indicating a drop in robustness without a noticeable gain in performance.

Figure 15A:
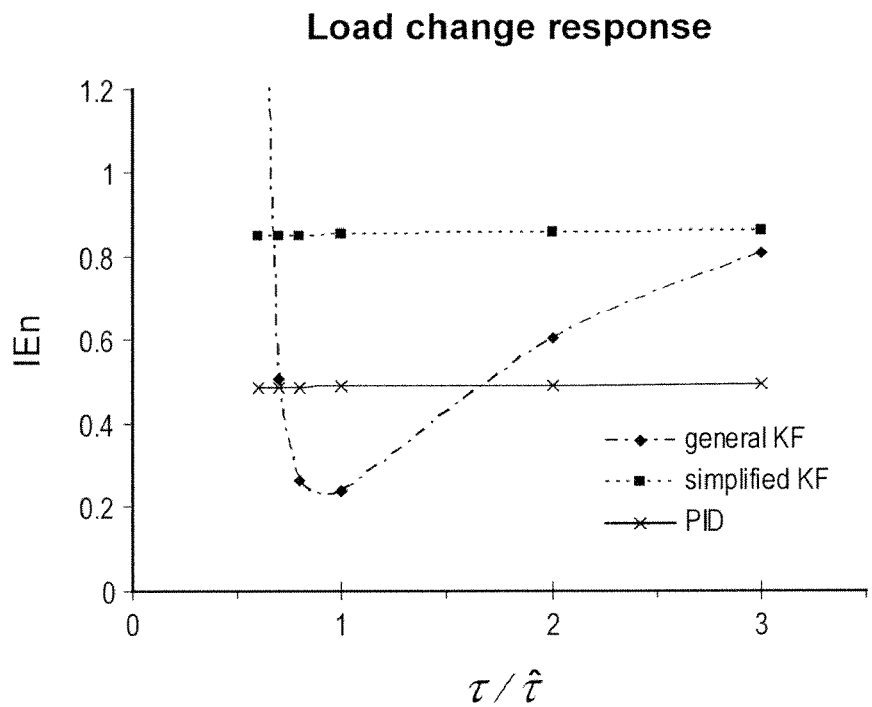
FIGS. 15A and 15B depicts charts providing a comparison of robustness and performance with manual tuning of integral action on the future error vector of MPC controllers in a second order process.
Figure 15B:
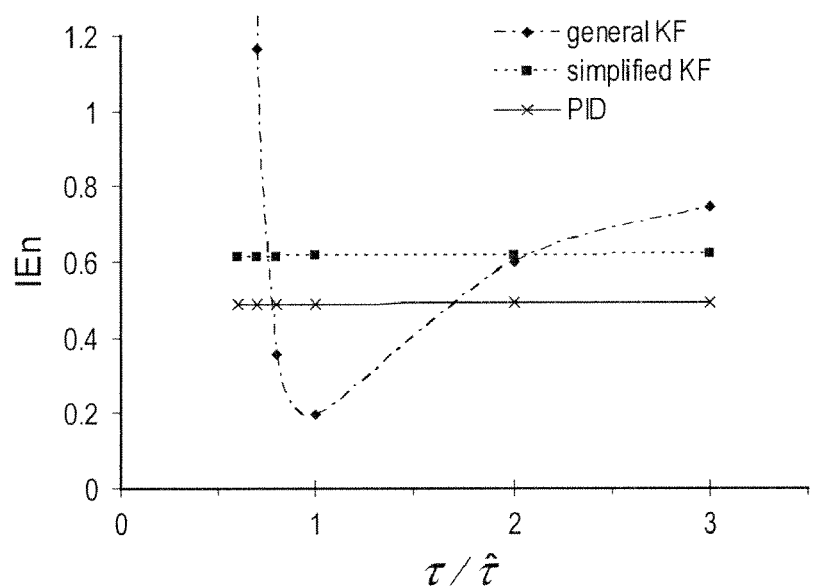

The same type of tuning analysis was implemented on the aforementioned second order process with model predictive controller tuning, and the controller performance results for this scenario are illustrated in FIGS. 15A and 15B for various model mismatches. Here, the plots of FIG. 15A illustrate controller performance without tunable integral action, while the plots of FIG. 15B illustrate controller performance with integral action. As shown in FIGS. 15A and 15B, the outcome is surprisingly different. While augmenting an integrator to a FOPDT loop benefited all model predictive controllers, augmenting the exact same integrator to a SOPDT loop only improved the performance of the MPC with a simplified Kalman filter. As mentioned above, this type of MPC is relatively insensitive to model mismatch when applied to a second order process. Thus, lowering the nearly flat performance plot of the MPC with simplified Kalman filter by such a significant amount results in overlap with the curve of MPC with general Kalman filter at about $\tau/\tilde{\tau}=2$.

Therefore, while it is advantageous to use general Kalman filtering on a second order process, if no or very little model mismatch is expected, it is best to switch to simplified Kalman filtering if model mismatch is expected to be outside of $0.75<\tau/\tilde{\tau}<2$. If set point changes are introduced to a model predictive controller with augmented integral action, the same negative effect on set point change performance as seen on PID controllers will be encountered. Similarity, as with PID control, one can use a two degrees of freedom formulation to reduce or completely cancel out this effect.

The above discussion illustrates that the control performance of PID is less impacted by model mismatch than model-based controllers, such as MPC. Furthermore, the feedback control performance, i.e. the rejection of unmeasured disturbances, of PID controllers is better than that of MPC controllers to start with as long as a process is lagtime-dominant. If the deadtime fraction changes to deadtime-dominant, then MPC is better at controlling the process because it uses an internal model to account for deadtime. A method is described herein that combines the features of MPC and PID, thereby positively impacting the feedback control performance. This method takes advantage of model-based control and integral tuning in the appropriate region of fractional deadtime. While MPC has inherent integral action that allows offset-free control, the tuning of integral action is critical to feedback control performance. Conventional PID tuning rules that favor feedback control performance or adaptive tuning can be applied to calculate reasonable tuning. Because the integral action is applied to the future error vector calculation only, it automatically becomes more prominent if the error is caused by model mismatch (as opposed to disturbance or set point change). In other words, while the integral action contributes when it is needed, it does not diminish performance when it is not needed. As a result, augmented integral action improves control performance without reducing robustness.

Another interesting point is that the impact of integral action drastically differs if a first or second order process is being controlled. If an algorithm is used to automatically determine all tuning parameters through optimization, then the model order is an important variable in the objective function. However, significant differences are only observed between first and second order processes. The difference between second and higher order processes is negligible.

The newly developed technology described herein demonstrates feedback control performance improvements, and it is believed that this method could have great positive impact on a challenging process such as the one from Solutia described above. In fact, it is possible that the MPC control performance would have been as good as or better than the PID control performance. Thus, while other methods may be used to compensate for known and unknown model mismatch in an optimal way, the unique contribution of the technique described herein is that the feedback control performance of a model predictive controller can be improved by a simple addition of tunable integral action. The tuning of such integral action can be performed easily using well known and well tested tuning rules that are typically used for PI and PID tuning. One big advantage of PID is that it can be tuned without knowledge of process models. PID tuning methods have been developed that utilize simple factors to configure desired gain and phase margins to accommodate a user-specifiable tradeoff between performance and robustness. Many of these tuning methods allow testing the process with very little perturbation. At the same time, the abundance of tuning rules can be a disadvantage. The MPC method described herein however improves model predictive control performance by augmenting MPC control with tunable integral action and thereby provides a method that uniquely utilizes knowledge of the dynamic behavior of disturbances to calculate corrective action that can be added directly to the manipulated variable of a model predictive controller. This action is similar to how a PID algorithm includes past error characteristics in the calculation of corrective action and improves the feedback control performance dramatically for control scenarios with model mismatch and/or changing dynamics.

Although the invention has been described with reference to the specific exemplary embodiments intended to instruct and illustrate the invention, the disclosed MPC technique is not limited to those embodiments. Various modifications, improvements and additions may be implemented by those with skill in the art, and such modifications, improvements, and additions will not depart from the scope of the invention.

For example, while the MPC technique described above has been described in conjunction with the use of process models in the form of first order plus deadtime models, these techniques can be used with other type of process models including, for example, state-space process models, regressive models, such as ARX models, finite impulse response models (FIR), step response models, etc. Moreover, while the description of the MPC controller with tunable integral action provided herein has been discussed in the context of a single loop MPC controller, this technique is applicable to and can be extended to multivariable MPC controller configurations.

Also, those skilled in the art will understand that the partitioning of individual components of the MPC controller blocks and controller units as described herein is discretionary to those responsible for controller implementation and operation. It will be understood that all of these functions can be implemented in any desired manner on any desired device(s). Moreover, while the MPC controller technique described herein is preferably implemented in software, it or any portions thereof may be implemented in hardware, firmware, etc., and may be implemented by any other processor associated with a process control system. Thus, the elements described herein may be implemented in a standard multipurpose CPU or on specifically designed hardware or firmware such as an application-specific integrated circuit (ASIC) or other hard-wired device as desired. When implemented in software, the software routine may be stored in any computer readable memory such as on a magnetic disk, a laser disk (such as a CD, a DVD, etc.), a flash drive or other storage medium, in a RAM or ROM of a computer or processor, in any database, etc. Likewise, this software may be delivered to a user or a process plant via any known or desired delivery method including, for example, on a computer readable disk, a smart card memory, a flash drive, or other transportable computer storage mechanism or over a communication channel such as a telephone line, the internet, etc. (which are viewed as being the same as or interchangeable with providing such software via a transportable storage medium).

Moreover, the claims provided herein are properly construed to embrace all modifications, variations and improvements that fall within the true spirit and scope of the invention, as well as substantial equivalents thereof. Accordingly, other embodiments of the invention, although not described with particularly herein, are none-the-less comprehended within the scope of the invention.

The invention claimed is:

1. A model based process controller for use in controlling a process, comprising:
    a controller input to receive one or more process measurements indicative of a controlled variable within the process;
    a controller output to provide one or more control signals for controlling a manipulated process variable of the process;
    a process model unit including a process model that models the operation of a process, wherein the process model unit produces a predicted process variable value based on the process model;
    a control unit that uses the predicted process variable value and a process variable set point to generate a preliminary control signal;
    an error unit that uses the predicted process variable value to generate an error signal;
    an integrator that integrates the error signal to produce an integrated error signal; and
    a combiner unit coupled to the integrator and to the control unit to combine the integrated error signal with the preliminary control signal to produce a final control signal for use in controlling the manipulated process variable of the process.

2. The model based process controller of claim 1, wherein the error unit determines an error between the predicted process variable value and a set point for the controlled variable and wherein the controller unit uses the error to produce the preliminary control signal.

3. The model based process controller of claim 1, wherein the error unit determines an error between the predicted process variable value and a measured value of the controlled variable to determine the error signal.

4. The model based process controller of claim 1, wherein the process model comprises one or more linear step response models or one or more impulse response models, and wherein the control unit implements a dynamic matrix control algorithm to produce the preliminary control signal.

5. The model based process controller of claim 1, wherein the process model is a first principles model.

6. The model based process controller of claim 1, wherein the process model is a first order plus deadtime process model.

7. The model based process controller of claim 1, wherein the process model is a second order process model.

8. The model based process controller of claim 7, wherein the process model is a second order plus deadtime process model.

9. The model based process controller of claim 1, wherein the control unit implements a model predictive control algorithm.

10. The model based process controller of claim 1, wherein the control unit implements a model predictive control algorithm including a Kalman filter.

11. The model based process controller of claim 10, wherein the Kalman filter is a general Kalman filter.

12. The model based process controller of claim 10, wherein the Kalman filter is a simplified Kalman filter.

13. The model based process controller of claim 1, herein the integrator is tunable.

14. The model based process controller of claim 13 wherein the integrator is tunable based on the factional deadtime of the process.

15. The model based process controller of claim 1, wherein the combiner unit comprises a summer.

16. The model based process controller of claim 1, wherein the process model unit uses one or more final control signal values as inputs to the process model to produce the predicted process variable value.

17. The model based process controller of claim 16, wherein the process model unit additionally uses one or more measured disturbance values within the process as inputs to the process model to produce the predicted process variable value.

18. A method of developing a set of process control signals for use in controlling a process, comprising:
producing a set of predicted process variable values from a process model that models the operation of the process and from a set of controller output values provided as inputs to the process model;
using the set of predicted process variable values to generate a set of preliminary control signals;
developing an error signal from the set of predicted process variable values and a further set of process variable values;
integrating the error signal to produce an integrated error signal; and
combining the integrated error signal with the set of preliminary control signals to produce the set of process control signals.

19. The method of developing a set of process control signals of claim 18, including using the set of process control signals to control the operation of the process.

20. The method of developing a set of process control signals of claim 18, wherein producing the set of predicted process variable values includes using a previous set of process control signals as the set of controller output values.

21. The method of developing a set of process control signals of claim 18, further including using one or more process measurements indicative of a controlled variable within the process along with the process model and the set of controller output values to produce the set of predicted process variable values.

22. The method of developing a set of process control signals of claim 18, further including using one or more process measurements indicative of measured disturbances within the process along with the process model and the set of controller output values to produce the set of predicted process variable values.

23. The method of developing a set of process control signals of claim 18, wherein developing the error signal from the set of predicted process variable values and a further set of process variable values includes determining an error between the set of predicted process variable values and a set of set points for a set of controlled variables.

24. The method of developing a set of process control signals of claim 18, wherein developing the error signal from the set of predicted process variable values and a further set of process variable values includes determining an error between the set of predicted process variable values and a set of measured values of a controlled variable.

25. The method of developing a set of process control signals of claim 18, wherein the process model comprises one or more linear step response models or one or more impulse response models, and wherein using the set of predicted process variable values to generate the set of preliminary control signals includes using a dynamic matrix control algorithm to produce the set of preliminary control signals.

26. The method of developing a set of process control signals of claim 18, wherein using the set of predicted process variable values to generate the set of preliminary control signals includes using a model predictive control algorithm to produce the set of preliminary control signals.

27. The method of developing a set of process control signals of claim 26, further including implementing a state observer in conjunction with model predictive control algorithm.

28. The method of developing a set of process control signals of claim 27, wherein the state observer is one of a general Kalman filter or a simplified Kalman filter.

29. The method of developing a set of process control signals of claim 18, further including enabling the integrator to be tuned.

30. The method of developing a set of process control signals of claim 18, further including enabling tuning of the integrator based on a factional deadtime of the process.

31. A process controller for use in controlling a process, comprising:
a processor;
a computer readable memory;
a process model stored on the computer readable memory that models the operation of the process;
a prediction routine stored on the computer readable memory that, when executed on the processor, uses a process control output signal and the process model to produce a predicted process variable value;
a control routine stored on the computer readable memory that, when executed on the processor, uses the predicted process variable value and a process variable set point to generate a preliminary control signal;
an error detection routine stored on the computer readable memory that, when executed on the processor, determines an error signal indicative of a difference between the predicted process variable value and a further process variable value;
a tunable integrator routine stored on the computer readable memory that, when executed on the processor, integrates the error signal to produce an integrated error signal; and
a combiner routine stored on the computer readable memory that, when executed on the processor, combines the integrated error signal with the preliminary control signal to produce a final control signal for use in controlling a manipulated process variable of the process.

32. The process controller of claim 31, wherein the prediction routine uses one or more process measurements indicative of a controlled variable within the process along with the process model and the process control output signal to produce the predicted process variable values.

33. The process controller of claim 31, wherein the prediction routine uses a previously calculated final control signal as the process control output signal.

34. The process controller of claim 33, wherein the further process variable value is a set point for a controlled variable and wherein the error detection routine develops the error signal as a difference between the predicted process variable value and the set point for the controlled variable.

35. The process controller of claim 33, wherein the further process variable value is a measured process variable value for a controlled variable and wherein the error detection routine develops the error signal as a difference between a previously predicted process variable value and the measured process variable value for the controlled variable.

36. The process controller of claim 33, wherein control routine implements a dynamic matrix control algorithm to generate the preliminary control signal.

37. The process controller of claim 33, wherein control routine implements a model predictive control algorithm to generate the preliminary control signal.

38. The process controller of claim 33, wherein control routine implements a model predictive control algorithm and a state observer algorithm to generate the preliminary control signal.

39. The process controller of claim 38, wherein the state observer algorithm comprises one of a general Kalman filter or a simplified Kalman filter.

40. The process controller of claim 31, wherein the tunable integrator is tunable to different integration settings based on a factional deadtime of the process.

* * * * *

UNITED STATES PATENT AND TRADEMARK OFFICE
CERTIFICATE OF CORRECTION

PATENT NO. : 8,200,346 B2  
APPLICATION NO. : 12/698991  
DATED : June 12, 2012  
INVENTOR(S) : Thiele Page 1 of 1

It is certified that error appears in the above-identified patent and that said Letters Patent is hereby corrected as shown below:

In the Specification:

Column 5, line 30, "can not" should be -- cannot --.

Column 5, line 35, "do no" should be -- do so --.

Column 8, line 33, "apart" should be -- a part --.

Column 12, line 36, "amore" should be -- a more --.

Column 14, line 49, "optical" should be -- optimal --.

Signed and Sealed this  
Seventh Day of January, 2014

Margaret A. Focarino  
*Commissioner for Patents of the United States Patent and Trademark Office*